United States Patent [19]

Kotcharian

[11] 4,021,982

[45] May 10, 1977

[54] HEAT INSULATING WALL STRUCTURE FOR A FLUID-TIGHT TANK AND THE METHOD OF MAKING SAME

[75] Inventor: Michel Kotcharian, Paris, France

[73] Assignee: Technigaz, Paris, France

[22] Filed: June 17, 1976

[21] Appl. No.: 697,038

Related U.S. Application Data

[63] Continuation of Ser. No. 542,509, Jan. 20, 1975, abandoned.

[30] Foreign Application Priority Data

Jan. 24, 1974 France .............................. 74.02425
Sept. 27, 1974 France .............................. 74.32737

[52] U.S. Cl. .............................. 52/410; 220/9 LG; 220/15
[51] Int. Cl.[2] .................. E04B 1/62; E04C 2/32
[58] Field of Search ............ 52/404, 410, 573, 249; 220/9 LG, 15, 5 A

[56] References Cited

UNITED STATES PATENTS

| 3,112,043 | 11/1963 | Tucker | 220/15 |
|---|---|---|---|
| 3,122,259 | 2/1964 | Meesen | 220/15 |
| 3,226,899 | 1/1966 | Blickle | 52/204 |
| 3,245,179 | 4/1966 | Hawkins | 52/410 |
| 3,392,866 | 7/1968 | Alleaume | 220/15 |
| 3,477,606 | 11/1969 | Schwendtner | 220/9 A |
| 3,485,409 | 12/1969 | Becker | 220/9 A |
| 3,547,302 | 12/1970 | Jackson | 114/74 A |

*Primary Examiner*—Price C. Faw, Jr.
*Assistant Examiner*—James L. Ridgill, Jr.
*Attorney, Agent, or Firm*—Kenyon & Kenyon Reilly Carr & Chapin

[57] ABSTRACT

A fluid-tight heat insulated tank wall structure comprising a rigid outer wall, an inner membrane-like impervious primary barrier wall and an intermediate heat insulating material carrying said inner wall and consisting of: an inner end layer of balsa wood or polyvinyl chloride, one composite laminated layer of sandwich panels composed of two spaced plywood plated and filling material interposed therebetween; and an outer end layer of cellular material.

22 Claims, 31 Drawing Figures

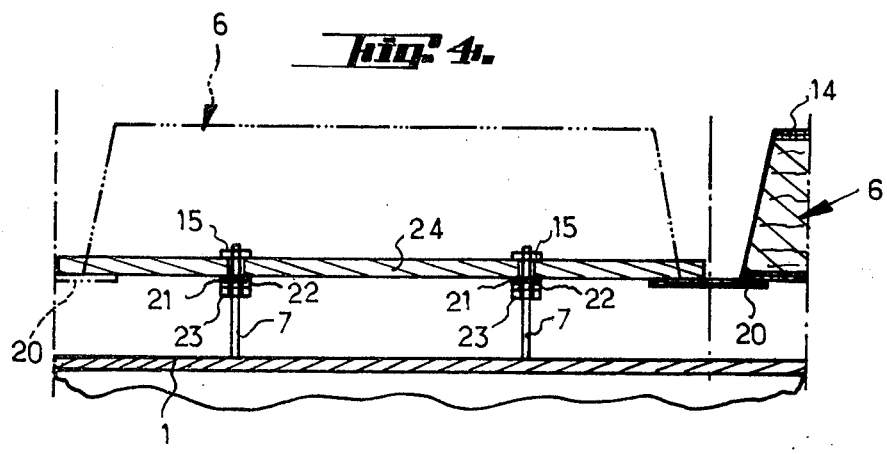
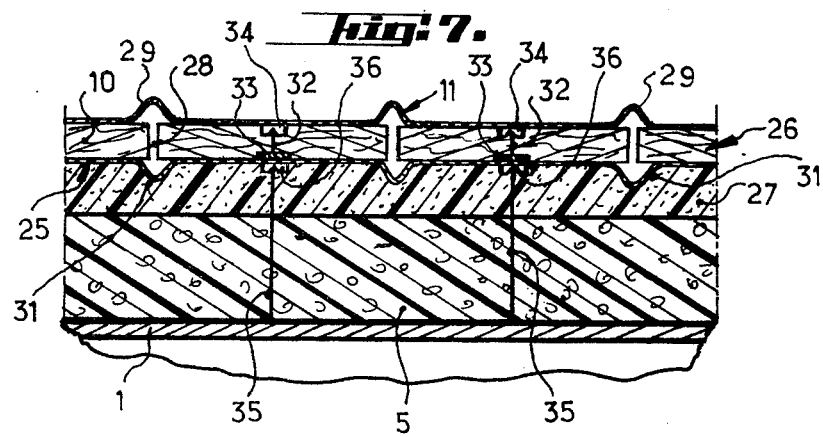
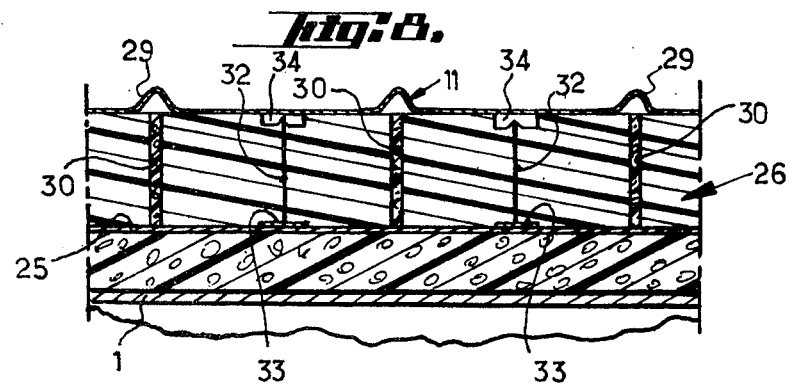

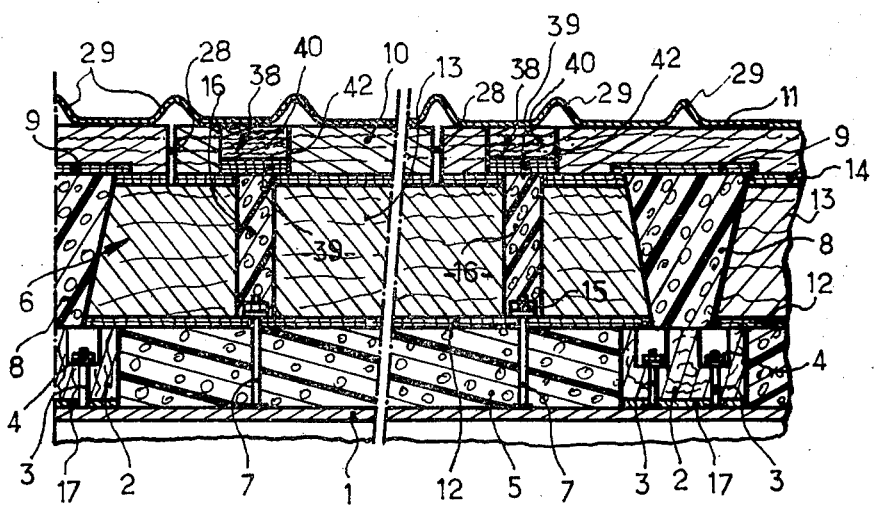
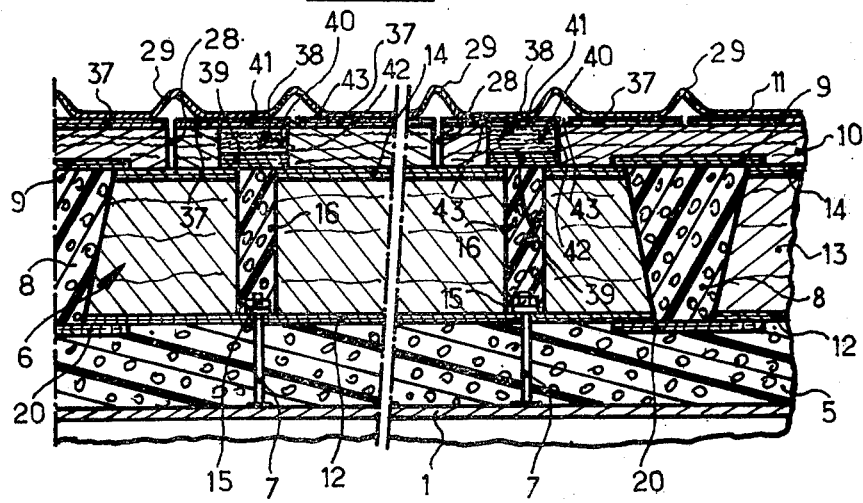

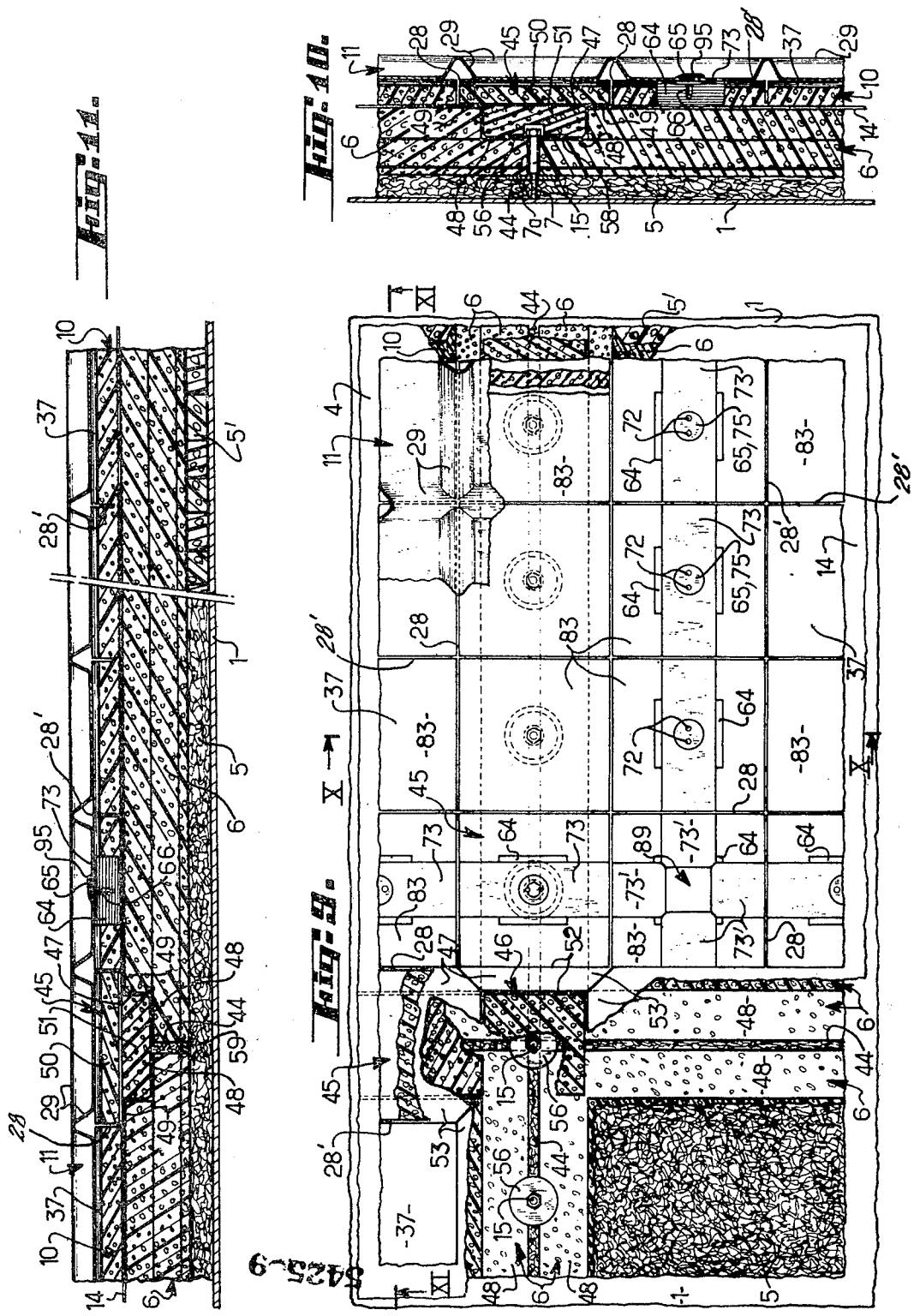

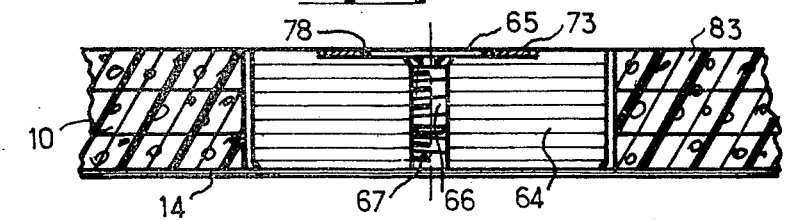
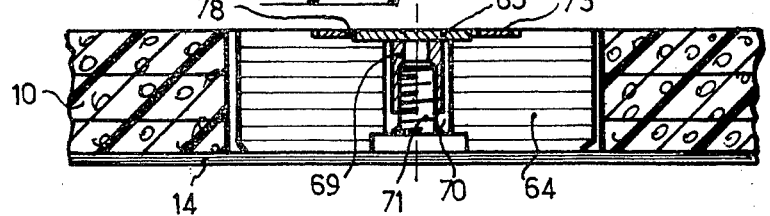
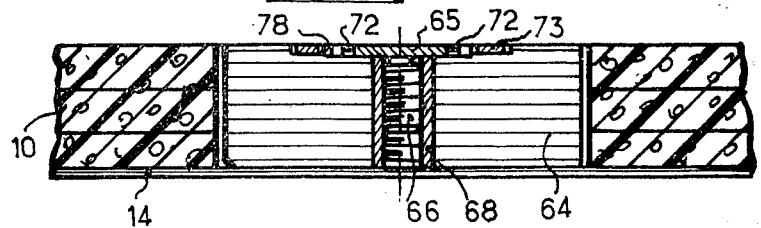
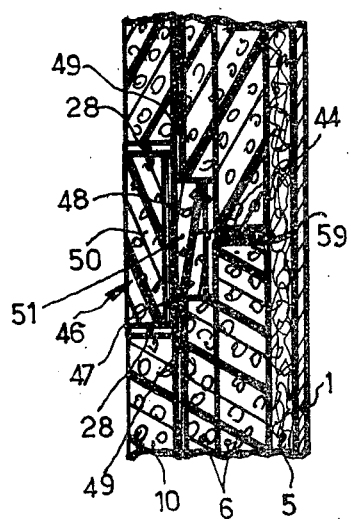
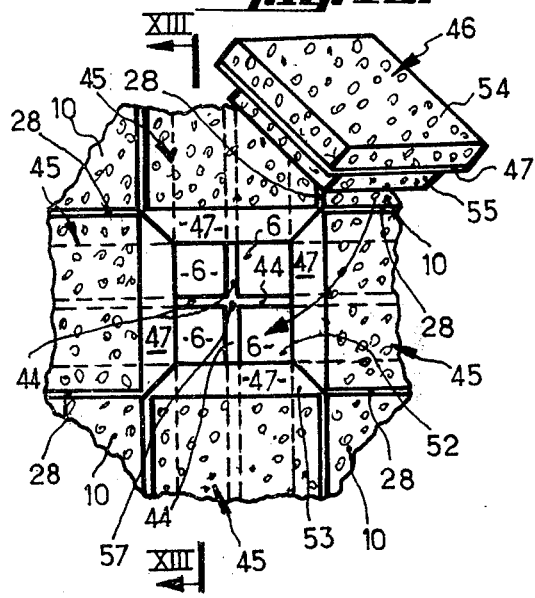

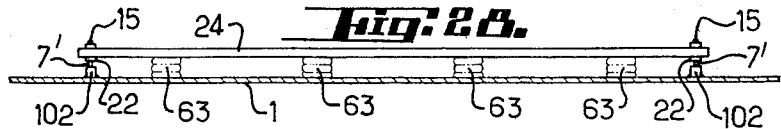
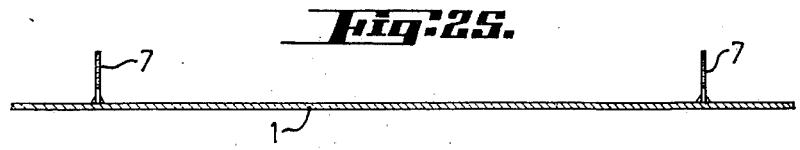
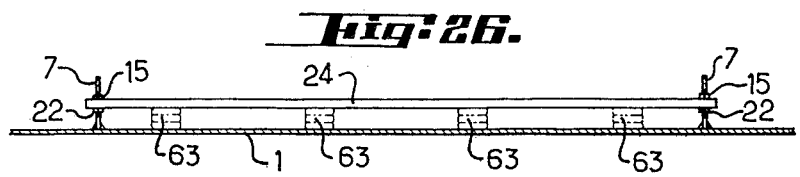
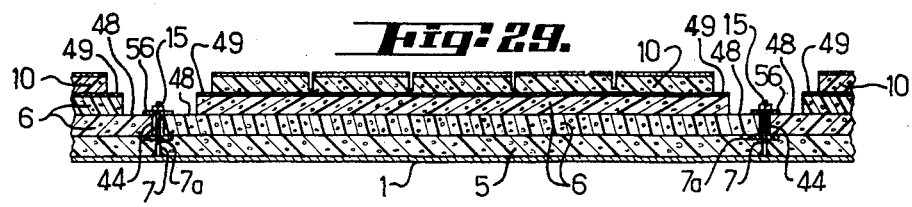
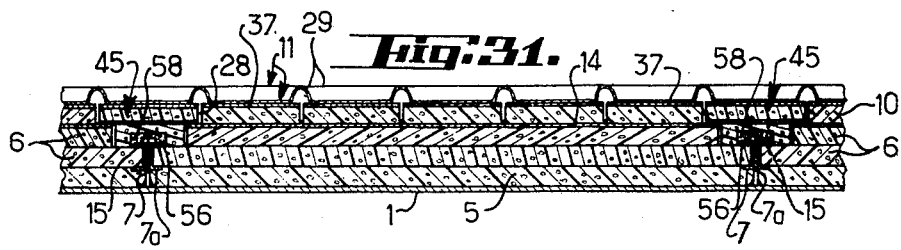
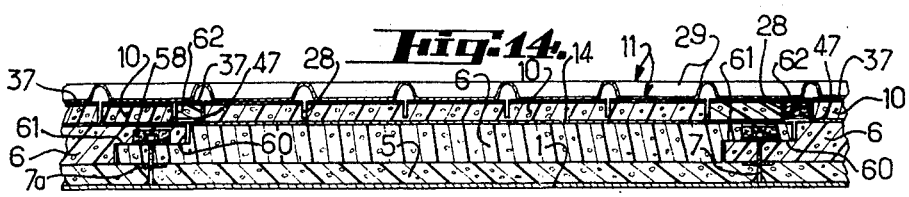

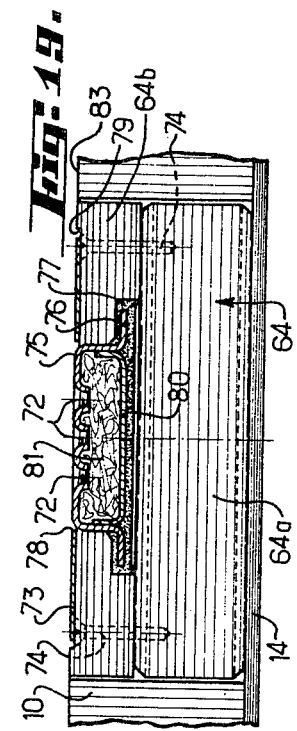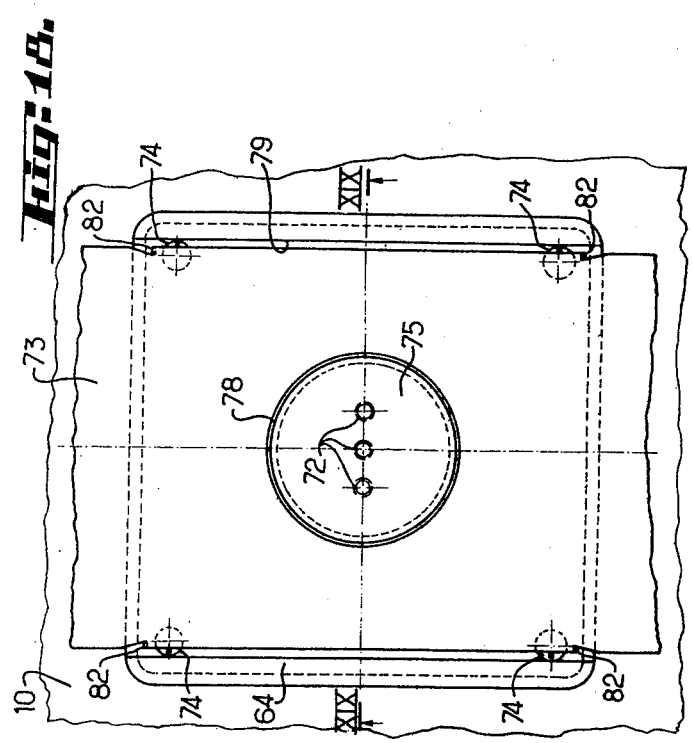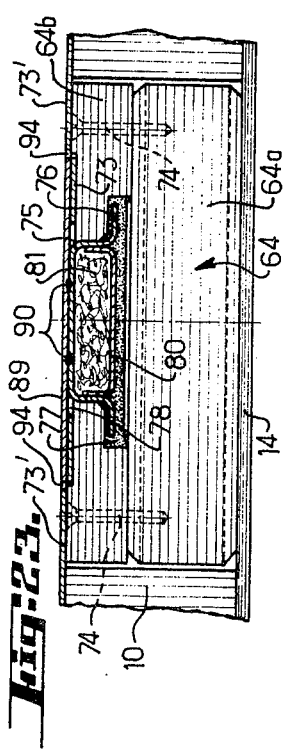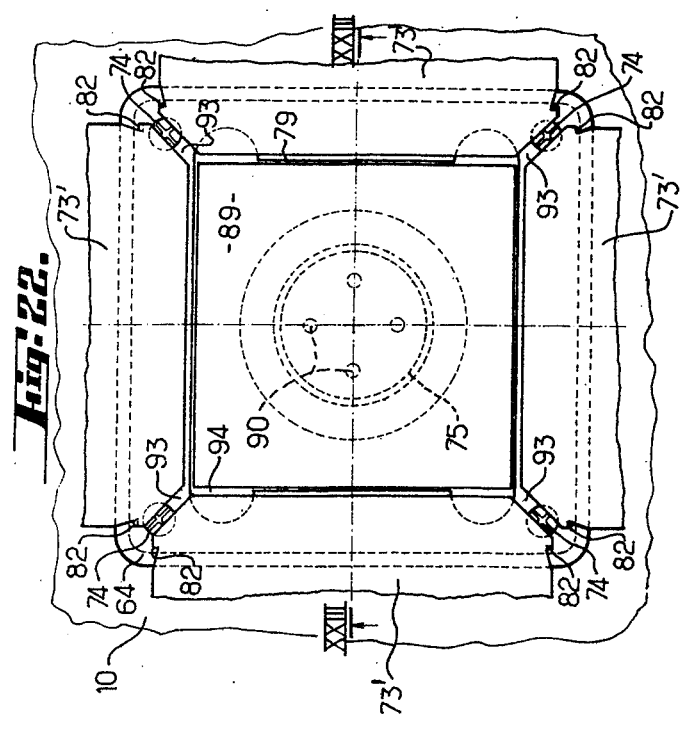

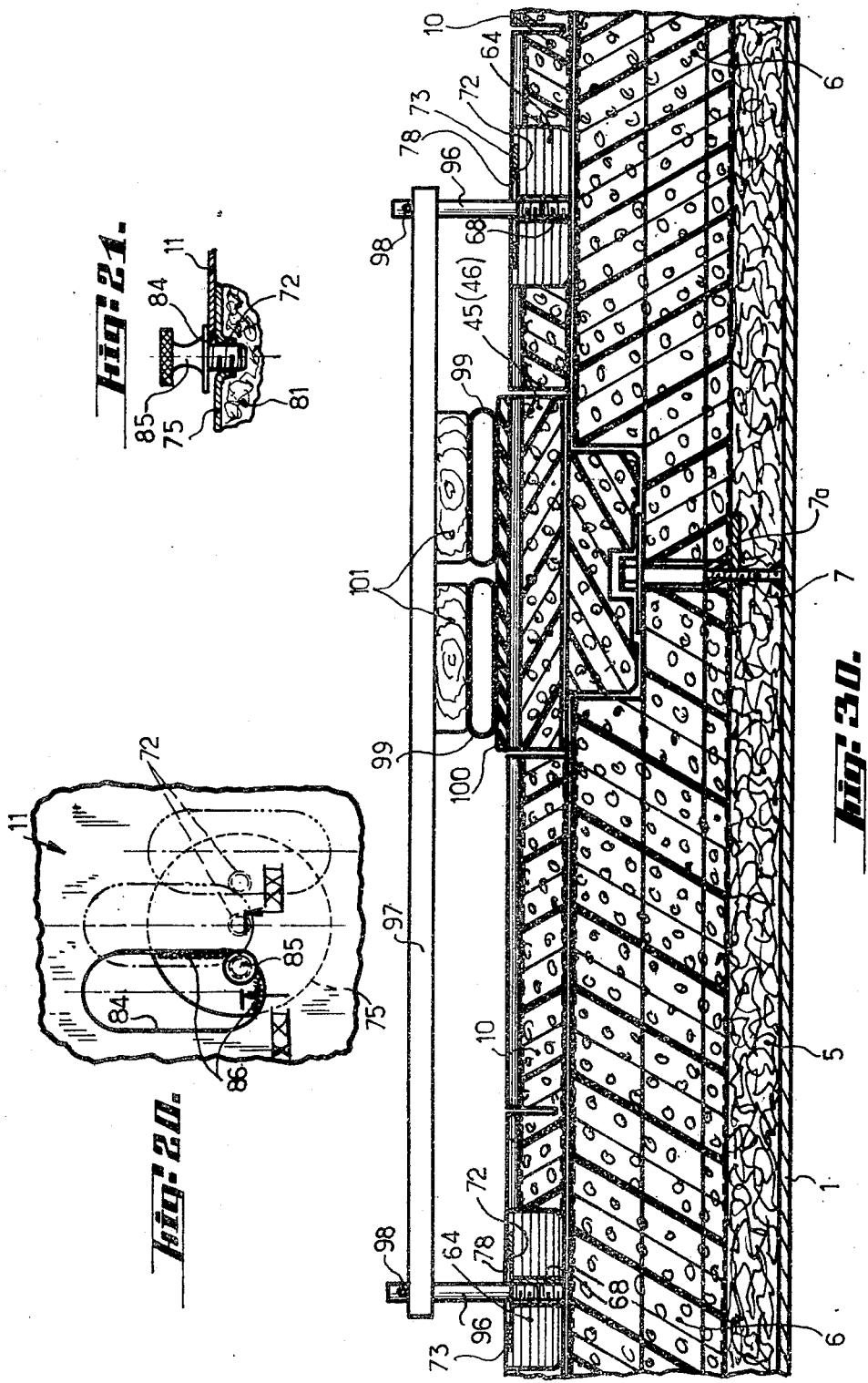

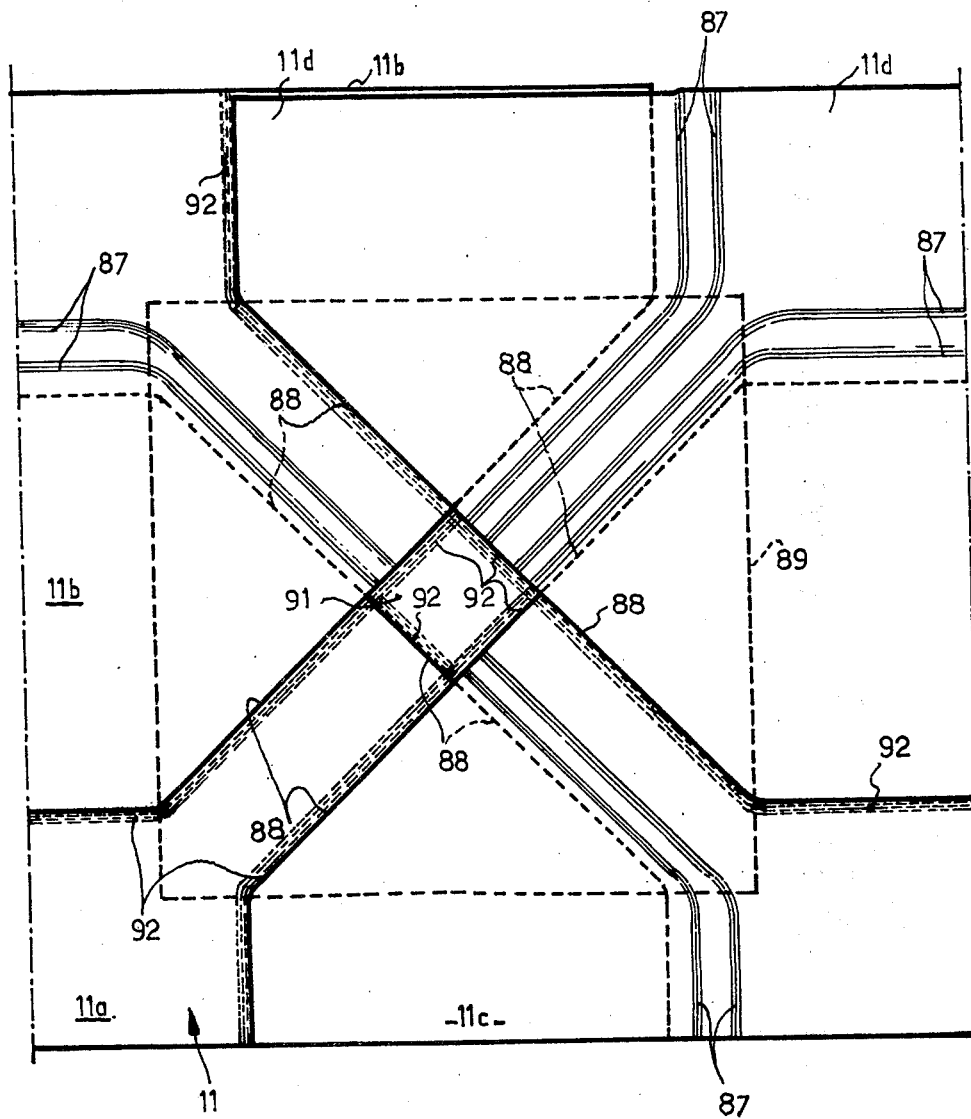

HEAT INSULATING WALL STRUCTURE FOR A FLUID-TIGHT TANK AND THE METHOD OF MAKING SAME

This is a continuation of application Ser. No. 542,509 filed Jan. 20, 1975, now abandoned.

The present invention is directed generally and relates essentially by way of new industrial product to an improved device or construction forming a heat insulating wall structure of a confining enclosure or container forming a fluid-tight heat insulated storage, conveyance or preservation tank for a fluid having for instance a temperature substantially different from the ambient room temperature of the environmental medium as well as to a method of manufacturing or process or building such a structure or such a tank. The invention is also directed to the various applications and used resulting from putting said device and/or method into practice as well as to the systems, assemblies, arrangements, units, equipments and plants provided with such structures.

In the prior state of the art are already known tanks for the storage or the transportation of liquid and/or gaseous fluids exhibiting for a major part thereof a liquid phase such as for instance cryogenic fluids such as in particular liquified natural gases and more specifically methane, these tanks having an outer rigid or self-supporting wall, an inner substantially flexible or yielding membrane-like impervious wall or primary barrier spaced from said outer wall and an intermediate body of heat insulating material arranged in multiple layers in adjacent superposed relationship which is secured to the outer wall for instance by means of studs while substantially filling out the spaced defined between said respective outer and inner walls and capable of transferring loads such as hydrostatic and hydrodynamic pressure or forces as well as the weight of the contents from said inner wall to said outer wall, said inner wall being applied against said heat insulating material and supported or carried thereby. This heat insulating material usually comprises at least one inner end layer serving as a bearing surface for said inner wall. The known or presently existing structures exhibit various inconveniences among which a relatively complicated construction requiring a relatively large amount of expensive raw materials and manufacturing labour or workmanship thus resulting in a relatively high manufacturing cost price. One main object of the invention is to remove the aforesaid drawbacks and difficulties by providing a new improved structure of simpler, less expensive character and possibly lighter in weight. For this purpose to solve the technical problem set the invention proposes a device which in an embodiment is characterized in that said heat insulating material comprises successively from the inside to the outside: at least one layer of wood such as balsa wood and/or cellular material such as for instance polyvinyl chloride; at least one composite laminated layer consisting of at least one panel including a least one plate of plywood or stiff synthetic material juxtaposed or bonded to at least one layer of filling material or preferably a pair of such plates of plywood or stiff synthetic material separated by an intermediate filling material to form a sandwich panel; and at least one layer of cellular, alveolate, porous or like fluid-tight or previous, homogeneous or heterogeneous material.

The invention will be better understood and further objects, charcterizing features, details and advantages thereof will appear more clearly as the following explanatory description proceeds with reference to the accompanying diagrammatic drawings given by way of non-limitative examples only illustrating various specific presently preferred forms of embodiment of the invention and wherein:

FIG. 4 is a similar showing a tooling arrangement or like implement and illustrating an operating step of the method of building the wall shown in FIG. 3;

FIG. 5 is similar to FIG. 1 but shows the structure modified according to an alternative embodiment;

FIG. 6 is similar to FIG. 3 but shows a modified embodiment of the wall structure;

FIG. 7 shows a similar view of another form of embodiment of the wall structure according to the invention;

FIG. 8 shows a similar view of still another form of embodiment of the wall structure according to the invention;

FIG. 9 shows a fragmentary top view with parts broken away and in cross section drawn on a larger scale of a complete portion of the fluid-tight heat insulating tank wall structure such as seen from the inside thereof according to another form of embodiment of the invention;

FIG. 10 is a view in cross section taken upon the line X—X in FIG. 9;

FIG. 11 is a longitudinal section taken upon the line XI—XI in FIG. 9;

Figure 1:
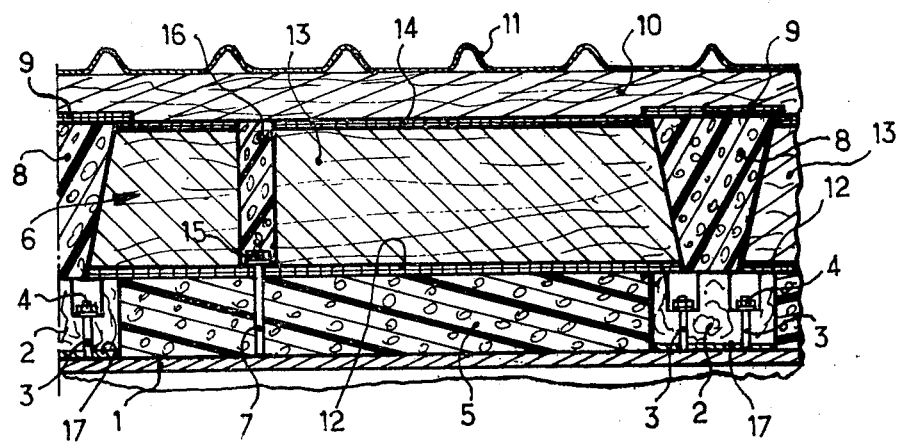
FIG. 1 shows a fragmentary cross-sectional view of a portion of a heat insulating wall structure according to a first embodiment of the invention.

FIG. 12 is a fragmentary partially exploded top view drawn on a smaller scale of the area of junction of four adjacent pair of overlying heat insulating panels and of crossing, concurrence or meeting of four welt-like buttstraps or cover-strips between panels leading thereto, respectively, together with the closing block forming a filling plug or sealing pad shown in perspective alone in the removed position;

FIG. 13 is a cross sectional view taken upon the line XIII—XIII in FIG. 12;

FIG. 14 is an enlarged view similar to FIG. 10 but showing an alternative embodiment of the junction between two adjacent main heat insulating panels of the intermediate layer or sheet thereof an either side of a same main heat insulating panel together with the associated welt-like butt-straps or covering strips, the anchoring means for the primary barrier having been omitted;

FIG. 15 is an enlarged fragmentary view in cross section through the inner end sheet or layer of heat insulating bearing panels together with a portion of asociated secondary barrier at the position of one single local anchoring arrangement for the primary barrier (not shown) according to a first form of embodiment thereof;

FIG. 16 is a view similar to the preceding one and showing a modification of the aforesaid local anchoring arrangement;

FIG. 17 is a view similar to both preceding ones but showing another form of embodiment of one aforesaid local anchoring system;

FIG. 18 is an enlarged fragmentary top view seen from the inside to another form of embodiment of one aforesaid local anchoring system for a primary barrier metal sheet (omitted);

FIG. 19 is a cross section taken upon the line XIX—XIX in FIG. 18;

FIG. 20 is a fragmentary inside top view drawn on a smaller scale and showing the fastening of a portion of primary barrier metal sheet onto a local anchoring system according to FIGS. 18 and 19 together with the use of a temporary local metal sheet retaining or holding tool or implement;

FIG. 21 is a partial cross-sectional view taken upon the line XXI—XXI in FIG. 20 and illustrating the use of the aforesaid tool;

FIG. 22 is similar to FIG. 18 but shows one aforesaid local anchoring system in the junction area of four adjacent rectangular metal sheets (omitted) of the primary barrier;

FIG. 23 is a cross section taken upon the line XXIII—XXIII in FIG. 22;

FIG. 24 is an enlarged fragmentary inside top view showing the anchoring of the common junction area of four adjacent rectangular primary barrier metal sheets onto one local anchoring system according to FIGS. 22 and 23;

FIG. 25 is a sectional fragmentary view of the outer metallic wall together with a pair of welded stud-bolts for fastening the heat insulating panels and illustrating the first operating step (laying of the stud-bolts) of the method of building one fluid-tight heat insulating tank wall having the configuration shown in FIGS. 9 to 11;

FIG. 26 is similar to the preceding one and illustrates a second operating step of the method of building (laying of a jig, gauge or like template defining the space for injecting the stuffing or filling product forming the outer end heat insulating layer after having possibly applied strings or lines of patches or pellets of mastic or like compound);

FIG. 27 is similar to FIG. 25 but shows an alternative embodiment of the operating step for laying the aforesaid stud-bolts (welding of tubular sockets, bushes or like sleeves threaded inside forming coupling collars or like base connectors for the stud-bolts);

FIG. 28 is similar to FIG. 26 but shows the second aforesaid operating step using the stud-bolt base connecting sockets together with short jig-fastening threaded rods, stems or like spindles;

FIG. 29 shows a more advanced stage of the building of the aforesaid wall after the successive operating steps of forming the outer and heat insulating layer through injection, laying the central layer of prefabricated heat insulating main panels and mounting the inner end layer of prefabricated heat insulating bearing panels (but before laying the welt-like butt-straps or like covering strips);

FIG. 30 illustrates the operating step for laying the aforesaid welt-like butt-straps by means of a removable special tool set (after filling up through stuffing the joint gaps between adjacent heat insulating main panels); and FIG. 31 shows the finished wall upon completion of the method of building after the final operating steps of anchoring and mutually welding the primary barrier metal sheets (the anchoring systems having been omitted).

In the drawings like, similar, equivalent or corresponding structural elements have been denoted by the same reference numerals.

According to the exemplary form of embodiment shown in FIG. 1 and such as applied to a tank integrated into the hull or hold of a tanker ship for instance for conveying liquified natural gas the fluid-tight heat insulating wall structure of such a tank comprises successively from the outside towards the inside:

one self-supporting or rigid outer in particular metallic wall generally denoted by the reference numeral 1 and constituted for instance by the double steel hull of a ships;

a grating or lattice of wooden joists 2 forming for instance a network system or substantially rectangular pattern areas consisting of spaced wooden beams such as balks, thick boards or planks or like pieces of timber secured to the inner face of the outer wall 1 by means of stud-bolts or the like 3 advantageously welded to the wall 1 and the opposite free ends of which together with their retaining or clamping nuts 4 are advantageously embedded or sunk into a hollow recess or like accommodating housing 4' formed in each joist 2;

a cellular material 5 filling out all of the spaces left between the joists 2;

a layer of sandwich panels 6 spaced from each other and resting with their peripheral edges against the joists 2 while being secured to the outer wall 1 at discrete fastening points by means of stud-bolts 7 advantageously welded to the outer wall 1, the gaps left between adjacent panels being filled up with interposed joint packing inserts 8 made of instance from polyvinyl chloride and lined of faced inside with plywood covering strips or similar welt-like butt-straps 9;

a layer of balsa wood 10 juxtaposed or bonded to the layer of sandwich panels;

an impervious primary barrier 11 consisting advantageously of a thin, corrugated, pleated, fluted, crinkled, ribbed or embossed metal sheet made for instance from stainless steel and formed with at least one set of spaced, substantially parallel corrugations projecting from the inside or inner face only.

Each sandwich panel 6 advantageously exhibits a cross section in the shape of an isosceles trapezium the non-parallel sides of which are converging or tapering from the outside towards the inside so as to define together with each adjacent sandwich panel a mating gap having a cross section also in the shape of an isosceles trapezium the non-parallel sides of which are diverging from the outside towards the inside. Each sandwich panel 6 advantageously consists from the outisde towards the inside of: one outer plywood plate 12 having a thickness of for instance 12 mm; three superposed intermediate balsa wood layers 13 with an aggregate thickness of for instance 155 mm; and of an inner plywood plate 14 with a thickness of for instance 3.4 mm which may together with the plywood butt-straps or like covering strips 9 possibly be used as a fluid-tight secondary barrier. Each panel fastening stud-bolt 7 holds or retains the corresponding sandwich panel 6 by its securing or clamping nut 15 applied against the inner face of the outer plywood plate 12 by being fully screwed down to the bottom of a corresponding access hole successively extending through the inner plywood plate 14 and the intermediate balsa wood layers 13 while being closed or filled out by a core-like sealing plug 16 made from cellular material such as polyvinyl chloride.

Between every joist 2 and the outer wall 1 is advantageously interposed a stuffing pad or like packing material 17.

Assuming that the temperature inside of the tank is − 160° C, that the outer room or ambient temperature is − 18° C and that the temperature inside the double hull 1 is equal to − 21° C a temperature of about −45° C is obtained on the outside face of the outer plywood plate 12 for a joist height of 105 mm and a heat transfer factor or like coefficient of thermal conductivity of 0.020 for the cellular material.

The method of building such a wall structure consists in: laying stud-bolts 3 and 7 for fastening joists 2 and panels 6, respectively, in particular through welding against the outer wall 1; preparing the surfaces through a processing treatment promoting the adhesion or bonding of the cellular material 5; laying said joists 2 by securing same to the joist-fastening stud-bolts 3 while possibly interposing a stuffing or padding material 17 between said joists 2 and the outer wall 1; laying plywood covering strips or welt-like butt-straps at the crossings of said joists, respectively; laying the sandwich panels 6 on the one hand by securing same to the panel-fastening stud-bolts 7 and on the other hand by sticking, gluing or adhesively bonding same to the joists 2; using the sandwich panels 6 as a framing, shuttering or like formwork or casing to define a cellular material 5 injection mould with the outer wall 1 and the joists 2 for injecting said cellular material into said mould and causing its subsequent expansion on site, i.e. on the spot; filling up and sealingly closing the access holes for the nuts 15 serving to secure the sandwich panels 6 with cores of cellular material 16; filling up each gap left between any two adjacent sandwich panels with an intermediae joint packing insert 8 made from synthetic materal; laying a plywood welt-like butt-strap or covering strip onto each intermediate joint packing insert 8; laying for instance through sticking, gluing or like adhesive bonding the aforesaid balsa wood layer 10 onto said sandwich panels 6; and fastening the primary barrier 11 to said balsa wood layer 10.

Figure 2:
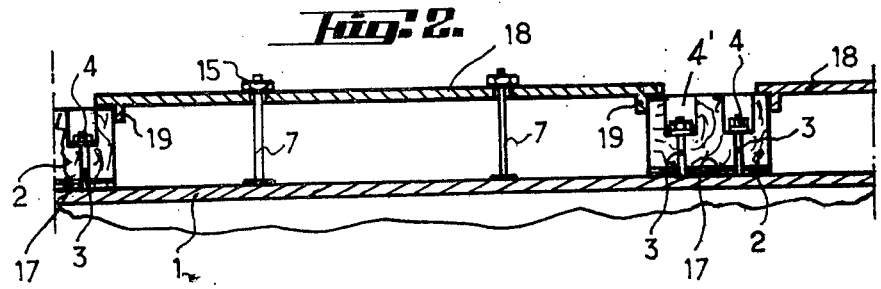
FIG. 2 is a similar view showing a tooling arrangement or implement usable during one operating step of the method of making the wall according to FIG. 1.

Alternatively and as shown in FIG. 2 it is possible prior to laying the sandwich panels 6 and injecting the cellular material 5 to lay over each closed space defined between the joists 2 and the outer wall 1 a jig, gauge or like template 18 forming a reusable removable shuttering or formwork plate resting against the joists 2 by securing it by means of the panel-fastening stud-bolts 7 to thereby define the aforesaid injection mould with said joists and outer wall 1, each jig being removed after said injection of cellular material 5 into each mould. Each jig 18 may advantageously be provided with an inner flange 19 enabling to position or centre it properly on the joists 2 somewhat like a cover or lid, the stud-bolts 7 extending through corresponding holes made in the jig 18. Each jig 18 is advantageously made from a transparent material enabling to observe the phenomenon of expansion of the cellular material 5 after the injection thereof but the jig may be manufactured from an opaque material.

Figure 3:
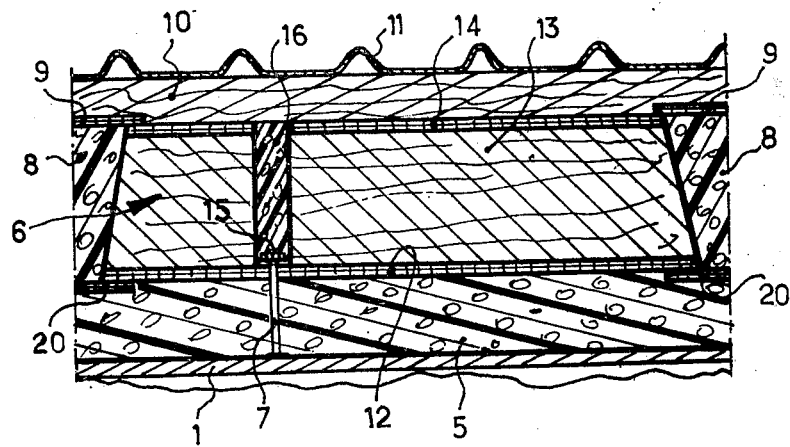
FIG. 3 is a similar view showing an alternative embodiment or modification of the wall structure according to the invention.

The form of embodiment according to FIG. 3 differs essentially from that of FIG. 1 by the ommission of all of the joists 2, so that the injected cellular material 5 extends as a continuous layer over the whole inner surface of the outer wall 1 to form a heat insulating filler body or stuffing product constituting a bearing pad or cushion distributed in a substantially continuous sheet preferably adhesively bonded to the outer wall 1. In this instance there is provided a butt-strap for instance of plywood 20 covering on the outer face of the layer of sandwich panels the separation gap (filled with cellular material 8) left between two adjacent sandwich panels, this butt-strap 20 being for instance stuck or glued against the outer face of one of the two panels while projecting therebeyond sidewise and far enough to partially straddle or overlap the neighbouring edge portion of the adjacent sandwich panel thereby to provide for the continuity of load transfer or transmission of forces within the outer faces (i.e. towards the hull) of the sandwich panels 6. Every butt-strap 20 has for instance a thickness of about 8 mm and the thickness of the layer of the cellular material 5 is for instance 44 mm.

In each one of both of the aforesaid embodiments the plywood may be replaced by any other equivalent material and the balsa wood may possibly be replaced by a cellular material such as polyvinyl chloride or the like. In FIGS. 1 and 3 one sandwich panel-fastening stud-bolt 7 only has been shown but it should be understood that each sandwich panel is held by a plurality of such stud-bolts.

The method of building the wall structure according to FIG. 3 differs from the method of building the construction according to FIG. 1 by the following features according to FIG. 4: before laying the sandwich panels 6 and injecting the cellular material 5 at least some of the panel-fastening stud-bolts 7 are provided with a resilient stop or abutment washer 21 spaced from the outer wall 1 and held by a retaining nut 22 locked for instance by a check-nut 23; each sandwich panel 6 is provided on its outside face and on at least one edge with a for instance stuck projecting plywood butt-strap 20; then are laid the sandwich panels 6 by securing same to the panel-fastening stud-bolts 7 while abutting against said stop washers 21; and afterwards the sandwich panels 6 set are used as a shuttering or form-work wall or like framing or casing to define the mould for injecting the cellular material 5 with the outer wall 1. In FIG. 4 has been shown in solid lines on the outermost right-hand portion thereof one portion of a sandwich panel 6 previously laid to which is affixed a butt-strap 20 whereas the sandwich panel 6 having just been laid to serve as a shuttering or form-work wall together with the other panels already laid is shown is dash-dotted lines. Instead of making use of the sandwich panels 6 to directly form a permanent shuttering or formwork wall for injecting the cellular material 5 it is also possible to use a jig, gauge or like template 24 forming the shuttering wall and mounted on the panel-fastening stud-bolts 7 while abutting against the resilient drop washers 21 and applying like the corresponding sandwich panel 6 against the protruding butt-straps 20 affixed to the adjacent sandwich panels 6 already laid previously. The resilient stop washers 21 provided on at least some of the fastening stud-bolts 7, for instance on three of four stud-bolts 7 at each location of a sandwich panel 6 are intended to take up the play or backlash due to the sagging or squeezing of the cellular material through compression and to exactly define the accurate position of the injection jig 24 or of the sandwich panel 6 used instead for limiting the expansion of the cellular material 5 to the desired thickness thereof.

It should be noted that if a temperature of −60° C is desired to be achieved on the outer face of the outer plywood plate 12 in the respective embodiments of FIGS. 1 and 3 the thicknesses of the sandwich panels should be of about 124 mm, respectively, if they contain balsa wood and 92 mm if they contain cellular material whereas the thickness of the cellular material 5 should be of 89 mm and 62 mm, respectively. If it is desired to reduce the evaporation of boil-off losses to a value of 64% of the present value the thicknesses of the sandwich panels should be 121 mm in both cases of FIGS. 1 and 3 and the thickness of the cellular material 5 should be 139 mm in the case of FIG. 1 and 95 mm in the case of FIG. 3. It should moreover be pointed out that the injection of cellular material 5 is generally followed by a hot chemical reaction causing the expansion or foaming of the material.

According to FIGS. 5 and 6 which show alternative embodiments of FIGS. 1 and 3, respectively, which may also be made by the aforesaid methods, the continuous facing layer consisting of the stiff plates, foils or sheets of inner lining 14 applied against the inner faces of the main sandwich panels 6 and of the relatively rigid butt-straps or welts covering the intermediate joint packing inserts 8 between said main panels, forms an impervious continuous sheet constituting a fluid-tight secondary barrier. This layer forming a secondary barrier the component elements of which are secured for instance by sticking, gluing or like adhesive bonding may be made from plywood such as sugar maple, hardmaple or rock-maple for instance or from a suitable synthetic or artificial plastics material.

The inner end heat insulating layer 10 forming a separating or spacing layer between both fluid-tight or sealing secondary barrier 9, 14 and primary barrier 11 (made for instance from thin corrugated metal sheet formed with at least one set of substantially parallel spaced corrugations 29 projecting unilaterally towards the inside only, i.e. from the inside face) consists of aligned elements 10 juxtaposed in non-contiguous or non-joined relationship and forming panels, blocks or slabs having opposite sides or edges respectively parallel to the respective directions of the corrugations 29 of the primary barrier, said elements 10 being spaced from each other and of such sizes that each separatng or spacing gap 28 left between any two adjacent elements is located substantially behind a corrugation 29 of the primary barrier 11 and extends along the same. Each separating or spacing gap 28 may either remain empty (i.e. contain air or an inert gaseous fluid) or be filled with a joint packing insert made from a flexible or yielding cellular material such as for instance polyurethane or any like or equivalent substance. Such a fractioning by dividing the aforesaid inner end layer 10 enables the latter to more easily follow the thermal expansions and contractions not only of themselves but also of the primary barrier 11 thereby reducing or preventing residual inner stresses or strains of thermal origin.

In the exemplary according to FIG. 5 the inner end layer 10 is made from balsa wood and therefore relatively stiff so that the primary barrier 11 may be directly applied against this balsa wood layer. In the exemplary embodiment according to FIG. 6 on the contrary the inner end layer 10 is made from a in particular expanded or foamed cellular synthetic material such as for instance polyvinyl chloride which is relatively soft or yielding so that it is advantageous that this layer of synthetic material be lined on its inner face receiving the application of the primary barrier 11 with a relatively stiffer load-distributing layer 37 consisting of plates, sheets or boards made for instance from plywood or suitable synthetic material and interposed between the separating layer 10 and the primary barrier 11. This load-distributing layer 37 should advantageously be discontinuous by being interrupted at each gap 28, respectively, left between the elements forming the layer 10 so as not to hinder or interfere with the aforesaid thermal deformations through their relative stiffness while enabling same to follow said deformations. The load-distributing layer 37 is preferably assembled or connected to the various elements, respectively, forming the inner end layer 10 in particular by sticking, gluing or like adhesive bonding at the time of separately prefabricating said elements.

According to FIGS. 5 and 6 each core or plug of cellular material 16 stopping or filling out the hole for laying the nut 15 of a stud-bolt 7 for fastening a main sandwich panel 6 is covered from the inside by a sidewise projecting plug 38 having preferably substantially the same material composition as the inner end layer 10 of which these plugs 38 are intergral parts. Every plug 38 thus comprises from the outside towards the inside: a portion of secondary barrier 39 consisting of a small plate, foil or board of plywood or rigid synthetic material; a block 40 stuck, glued or adhesively bonded to said small plate and made from the same material as the layer 10 (i.e. in particular from balsa wood in the case of FIG. 5 and from cellular material in the case of FIG. 6); as well possibly as a relatively rigid load-distributing layer or plate 41 stuck, glued or adhesively bonded to the block 40 in the case of FIG. 6 where this block is made from cellular material. Each plug 38 is advantageously stuck or glued with its portion of secondary barrier 39 against the secondary barrier 14 forming the inner lining of each main heat insulating panel 6. Each sealing plug or closing pad 40 is thus embedded or sunk into the layer 10 in flush or aligned relationship with the inner surface thereof and at least one junction or gap plane 42 between each plug 38 and the surrounding layer 10 is located advantageously behind or underneath a corrugation 29 of the primary barrier 11 whereas in the case of FIG. 6 the load-distributing layer 37 is interrupted about each plug 38 thereby leaving a peripheral gap 43 between the layer 37 and the small plate 41 of the plug.

The forms of embodiments according to FIGS. 7 and 8, respectively, comprise an intermediate impervious flexible or yielding membrane-like wall or secondary barrier 25 spaced from the primary barrier 11. A multiple-layer or laminated heat insulating intermediate material fills substantially out the spaces defined between the outer wall 1, the inner wall or primary barrier 11 and the intermediate wall or secondary barrier 25, respectively, and is adapted to transfer the loads from said inner wall to said outer wall, this heat insulating intermediate material including at least one separating inner end layer 26 interposed between both primary and secondary barrier 11, 25, respectively, which are applied against said separating layer 26 and supported thereby.

This separating layer 26 consists either of plywood or balsa wood as in FIG. 7 or of rigid foamed synthetic material such as for instance polyvinyl chloride as in FIG. 8 whereas that portion of said heat insulating material which is located between the intermediate wall 25 and outer wall 1, respectively. is made from a body of injected foamed or expanded synthetic material 5 possibly stuck, glued or otherwise adhesively bonded to the outer wall 1 with a layer of joined or closely juxtaposed panels made from possibly stiffer foamed or expanded synthetic material 27 being possibly interposed between said body of synthetic material 5 and the secondary barrier 25.

The primary barrier 11 may consist of a thin metal sheet made for instance from stainless steel and substantially smooth or flat but according to the forms of embodiments illustrated in FIGS. 1, 3 and 5 to 8, respectively, it may also as already stated consist of a corrugated, embossed, ribbed, fluted or pleated metal sheet formed with at least one set of spaced substantially parallel corrugations projecting towards the inside or from the inner face only. According to the examplary embodiment of FIG. 7, the separating layer 26 consists of elements forming panels, blocks or like slabs of material positioned endwise and having opposite sides or edges respectively parallel to said corrugations, said elements being spaced from each other and of such sizes that each separating gap 28 between any two adjacent elements is located substantially at a corrugation 29 of the primary barrier, i.e. behind or underneath same and extends along the latter.

Each separating gap 28 may consist of a space remaining empty or void as in FIG. 7 (in a manner similar to FIGS. 5 and 6) or filled with a joint packing insert 30 made from flexible or yielding cellular material such as for instance polyurethane as shown in FIG. 8.

The secondary barrier 25 may consist of thin metal sheet made from stainless steel which may either be smooth or substantially flat or be corrugated, embossed, ribbed, fluted or pleated and formed with at least one set of spaced substantially parallel corrugations 31 projecting towards the outside, i.e. from the outer face only as shown in FIG. 7. In this latter case the corrugations 31 of the secondary barrier 25 are preferably substantially parallel to those 29 of the primary barrier 11 and have the same spacing distance (or wave length), i.e. the same distribution pitch as the latter by being located respectively each one substantially at or behind a corresponding corrugation 29 of said primary barrier 11.

Each one of the primary barrier 11 and/or secondary barrier 25 may advantageously comprise two sets of parallel corrugations each corrugation of one set crossing or intersecting substantially at right angles all the corrugations of the other set. The use of a separating layer 26 constituted according to the form of embodiment of FIG. 7 or of FIG. 8 wherein the spaced blocks of stiff heat insulating material are limited to the pitches of the corrugations in both perpendicular directions of extension of said corrugations offers the advantage that owing to the greater freedom of contraction of these blocks the thermal stresses or strains within the insulation as well as the forces at the edges resulting therefrom are substantially removed.

According to the form of embodiment shown in FIG. 8 the secondary barrier 25 may consist of an advantageously previously impregnated for instance substantially smooth, even or flat foil or sheet of synthetic material, for instance of artificial resin such as epoxyd resin or ethoxyline possibly reinforced or strengthened by glass fibres and adhesively bonded, stuck or glued to the injected foamed or expanded synthetic material 5.

Both respectively primary and secondary barriers 11 and 25 are advantageously connected to each other at spaced discrete points through the separating layer 26 by for instance metallic fastening means comprising each one a relatively fine rod, peg or sprig 32 (for instance with a diameter of 2 to 4 mm) secured to the inner face of the secondary barrier 25 possibly through the medium of a base plate 33 integral with one end of the rod 32. Such a fastening of each rod of sprig 32 may be carried out either by welding when the secondary barrier 25 is metallic as in the case of FIG. 7 or by sticking, gluing or adhesive bonding when the secondary barrier 25 is made from synthetic material as in the case of FIG. 8. The free or opposite end of each rod or peg 32 is engaged by a clamping or nipping member 34 secured as by welding to the outer face of the metallic primary barrier 11. Each clamping or nipping member 34 consists preferably of a cup-shaped or cage-like holding or gripping element secured with its peripheral skirt edge and through the bottom wall of which extends a hole with creased edges partially folded back inwards of the cup thereby forming closely spaced resilient or springly jamming tongues or tabs for nipping the rod 32 inserted by being driven therethrough under pressure into said holes as shown in FIGS. 7 and 8.

The secondary barrier 25 may be connected likewise to the outer wall 1 in particular when the secondary barrier is metallic as in the case of FIG. 7 which shows fine metallic pegs or rods 35 extending through the intermediate heat insulating material 5, 27 and possibly aligned with the points of mutual fastening of the respective primary and secondary barriers 11 and 25, that is with the rods 32, respectively. The metallic rods or pegs 35 are secured at discrete spots as by welding to the inner face of the outer wall 1 with one end of each respectively fine rod or sprig whereas its opposite end is engaged by a clamping or nipping member 36 having advantageously the shape of a cage or cup secured as by welding or sticking with its peripheral skirt edge to the outer face of said secondary barrier 25 and formed in its bottom wall with a hole with ends creased inwards of said cup to form closely spaced resilient or springy tongues or tabs for nipping the rod 34 inserted by being driven under pressure into said hole.

This method of anchoring the primary barrier 11 and/or the secondary barrier 25 offers the advantage of a greater facility for mounting each barrier which is thus secured through simple pressure applied by hand and completed by the pressure force exerted upon the contents of the tank or the cargo when putting the tank into operation for the first time. Moreover owing to the fact that each aforesaid fine rod or sprig 32, 35 may slide with a tight or force-fit that is in a manner relatively hindered by the friction opposed by the aforesaid resilient tongues in its associated nipping cup 34, 36 there are no occurrence of hard bearing points i.e. strongly withstanding compression at the position of fastening of each peg 32, 35 thereby enabling each barrier 11, 25 to yield relatively under pressure in a direction substantially at right angle or normal to its surface.

In the case of the form of embodiment shown in FIG. 8 the use of a secondary barrier 25 made from previously impregnated synthetic material (not yet polymerized with subsequent hot polymerization under pressure) offers the advantage of dispensing with any welding inherent in the use of metal sheets which weldings are then replaced by a simple sticking, gluing or like adhesive bonding with epoxy or the like.

The method of building according to the forms of embodiments illustrated in FIGS. 7 and 8, respectively, comprises the operating steps consisting in: affixing as by welding nipping cups 34 to the outer faces of the primary barrier 11; securing metallic fastening sprigs 32 to the inner face of the secondary barrier 25; applying through injection and subsequent expansion the synthetic foam material 5 or 5, 27 against the outer wall 1; anchoring the secondary barrier 25 against said synthetic foam material; mounting in spaced relationship the blocks of the separating layer 26 onto the secondary barrier 25 in particular by spitting same onto the metallic sprigs 32; and in laying the primary barrier 11 by securing it by means of its nipping cups onto said sprigs 32 and against the blocks 26.

In the case in particular to FIG. 7 and before laying the secondary barrier 25 a layer of panels made from stiffer synthetic foam material 27 is attached to the injected foam material 5 and said secondary barrier 25 is then applied onto said layer. Moreover in this form of embodiment and prior to laying the synthetic foam material 5 fine metallic pegs 35 are secured by welding to the inner face of the outer in particular metallic wall 1 and nipping cups 36 are secured to the outer face of the seconday barrier 25. This secondary barrier 25 is then affixed onto the sprigs 35 by means of the nipping cups 36 either after injection of the synthetic foam material 5, 27 or prior to such an injection in which case the secondary barrier then serves as a shuttering or formwork wall for defining the injection mould.

It is also possible prior to injecting the synthetic foam material 5, 27 to provide the aforesaid injection mould by securing at a given distance from the outer wall 1 a jig, gauge or like template forming a removable shuttering or like formwork plate or framing mounted on the metallic pegs 35 and possibly also on small auxiliary stud-bolts previously secured in particular by welding to the outer wall 1 and then said injection of synthetic foam material 5, 27 is carried out into the mould thus formed.

The synthetic foam material 5 may possibly be stuck, glued or otherwise adhesively bonded to the inner face of the outer wall 1.

In the case of FIGS. 1, 3, 5 or 6 if the wooden layer 10 is replaced by a layer of synthetic material for instance of polyvinyl chloride an inner plywood plate or board should be interposed between the primary barrier 11 and the layer of synthetic material 10.

FIGS. 9 to 13 show another form of embodiment of the fluid-tight heat insulating tank wall structure. This wall comprises successively from the outside towards the inside: the self-supporting outer in particular metallic wall 1; an intermediate pad or cushion of heat insulating material adapted to transfer pressure loads nd including the outer end filling layer 5, consisting of a heat insulating in particular injected stuffing or packing product forming a substantially continuous sheet and preferably adhesively bonded to the outer wall 1; a central sheet or layer of heat insulating in particular composite or laminated juxtaposed main panels 6 consisting for instance each one of three layers of cellular material such as in particular polyvinyl chloride or polyurethane superposed and stuck or glued, said central sheet being applied against the outer end layer 5 while being secured to the outer wall 1 by stud-bolts 7; a secondary sealing or fluid-tight barrier 14 and an inner end or separating layer consisting of a sheet of juxtaposed bearing panels for instance mainly made from cellular material such as polyvinyl chloride and separated by gaps; as well as the primary metallic fluid-tight or sealing barrier 11 made from thin corrugated metal sheet comprising preferably two orthogonally intersecting sets of parallel spaced corrugations 29 unilaterally projecting towards the inner exposed side or from the inner face and extending above said gaps and along the latter. Separating gaps 44 left between the successively adjacent main panels 6, respectively, and the gaps left between the bearing panels of the inner end layer 10 are centered on those which are provided between the main panels 6 whereas each gap between any two adjacent main panels is covered from the inside by a welt-like butt-strap or like covering strip 45 embedded, sunk or fitted at least between two adjacent bearing panels of the layer 10 in flush registering or aligned relationship with the surfaces thereof while leaving a gap 28 between each one thereof and said butt-strap 45. At every junction of four mutually adjacent main panels 6 the area of mutual crossing of the gaps 44 is internally covered by a for instance square or rectangular plug 46 nested or embedded at least between the respective ends of the four butt-straps 45 leading thereto in flush registering or aligned relationship with the surfaces thereof while leaving a gap 28 between said plug 46 and each butt-strap 45. Each butt-strap 45 and every plug 46 have substantially the same construction as the surrounding layers which are encompassing the same and respectively comprise one portion of secondary barrier 47 restoring the continuity with the secondary barrier 14.

Each bearing panel of the inner end layer 10 comprises two perpendicularly intersecting sets of parallel spaced for instance longitudinal and transverse slots or sits 28' extending through at least one or a major part of its thickness and opening at its inner face by forming a network system or pattern of orthogonally intersecting slots or slits whereas at least each butt-strap 45 is formed with such transverse slots or slits preferbly aligned or registering with the corresponding slots or slits of said bearing panels 10. Each slot and possibly each aforesaid gap 28 in the inner end layer 10 extend under or behind one corrugation 29, respectively, of the primary barrier 11.

Each bearing panel of the inner end layer 10 is for instance made from cellular material covered on its inner face by a relatively rigid lining plate or board for instance of plywood 37 and each slot or slit 28' provided in one bearing panel of the layer 10 is constituted by a substantially straight groove made for instance by means of a cut or score originating for instance from a saw-kerf or like cutting tool during the prefabrication of the panel, this cut or saw-kerf extending of course through the plywood plate or slab 37.

Each main panel 6 is stuck or adhesively bonded to the outer end layer 5 whereas the secondary barrier 14, 47 is glued or adhesively bonded to the main panels 6 and the bearing panels of the inner end layer 10 are stuck or adhesively bonded to the secondary barrier 14 onto the main panels 6. Each welt-like butt-strap 45 and each plug 46 are respectively stuck or adhesively bonded with their own portions of secondary barrier 47 to the secondary barrier 14 glued to the main panels 6 whereas each load-distributing plate 37 lining the bearing panels of the inner end layer 10 is stuck or adhesively bonded to the inner face thereof for being in direct contact with the primary barrier 11.

As more specifically shown in FIGS. 10, 11 and 13 the adjacent edges of two adjacent main panels 6 comprise each one on the inner side a rabbet, rebate or like ledge forming a flange or step 48 defining a groove together with the adjacent rabbet or rebate 48 of the adjacent main panel 6 and the bearing panel of the inner end layer 10 covering each main panel 6 is recessed from the shouldered edge or ledge of the associated rebate 48 thereby providing another step 49 so as to form together with the adjacent bearing panel a groove with at least two steps 48, 49 in which is fitted one aforesaid shouldered butt-strap 45 having a mating shape complementary of said stopped groove. Each butt-strap 45 thus comprises an inner layer 50 having substantially the same thickness as the bearing panel of the layer 10 and made for instance from cellular material possibly lined internally with a stiff load-distributing plate 37 made in particular from plywood whereas the outer facing consists of one aforesaid portion of secondary barrier 47, the layers 37 and 47 being respectively stuck or adhesively bonded to the opposite faces of the inner layer 50. Each butt-strap 45 moreover comprises an outer layer 51 made for instance from cellular material having substantially the same thickness as the depths of the aforesaid rebates 48 and preferably glued or adhesively bonded to the portion of secondary barrier 47. The transverse width of each butt-strap is smaller than that of the corresponding stepped groove 48, 49 accommodating same in order to provide peripheral gaps 28 and each butt-strap 45 is stuck or adhesively bonded on the one hand with its flange consisting of a portion of secondary barrier 47 to the secondary barrier 14 onto the main panels 6 and on the other hand with the botton of its outer layer 51 to the bottom of the groove defined by the rebates or ledges 48 while straddling or spanning the separating gap 44 left between two adjacent main panels 6.

At every junction of four main panels 6 the aforesaid rebates, ledges or steps 48, 49 form a cup or trough 52 (see FIGS. 9, 12 and 13) and the corresponding end of each aforesaid butt-strap 45 terminates at the alignment of the bearing panels of the inner and end layer 10 while letting the end of its attached portion of secondary barrier 47 project to the shouldered edge of said cup or trough 52 in the shape of a preferably substantially isosceles trapezoidal tongue 53 which is bilaterally contiguous along respective bevel or mitre joints to the corresponding tongues 53 of the adjacent butt-straps 45. The associated plug or stopper 46 has the same construction, width and thickness as the butt-straps 45 and a mating shape complementary of that of the cup or trough 52 but with longitudinal and transverse dimensions smaller than those of said cup or trough so as to fit therein with a peripheral clearance. Each plug or stopper 46 thus comprises an inner end layer 54 possibly lined internally with a relatively rigid load-distributing plate made for instance from plywood 37, the portion of secondary barrier 47 and one outer layer 55 recessed with its peripheral edge from the outer layer 54 so as to define a peripheral sidewise projecting flange through which the plug is bearing against the bottom of the cup or trough 52. Each plug 46 is stuck or adhesively bonded on the one hand with its ledge consisting of the portion of secondary barrier 47 to the corresponding or framing edge consisting of the trapezoidal tongues 53 and on the other hand with its outer end bottom to the bottom of the cup or trough 52 in straddling or overlapping relation to the intersection of the separating gaps 44 left between the four adjacent main panels 6.

Alternatively each trapezoidal tongue 53 may be replaced by a rectangular tongue in which case both aligned butt-straps 45 located on either side, respectively, of the cup or trough 52, should be respectively recessed or shifted backwards in opposite directions by an amount equal to the length of the tongue (in parallel relation to the longitudinal direction of the butt-strap) so as to be caused to abut against the longitudinal sides of the tongues of the two other butt-straps 45 aligned at right angles to the first ones. Thus the cup 52 and therefore the plug 46 are of rectangular shapes instead of square shapes.

As shown in particular in FIG. 10 each stud-bolt for fastening the main panels 6 comprises for instance a pair of members, namely one externally threaded male member 7 and one internally threaded female member 15 (forming a nut) adapted to be screwed into each other, one of them being secured to the outer wall 1 and the other one being removable and comprising a head. Thus in FIG. 10 the male member 7 is welded to the outer wall 1 whereas the female 15 of hollow shape consists of a tubular or plunger-headed nut. Each stud-bolt extends through the separating gap 44 left between two adjacent main panels 6 so as to bear with its head 15 simultaneously against the flanges consisting of the two respective rebates or ledges 48 thereof preferably through the medium of an interposed bearing washer or small plate 56 projecting in straddling or overlapping relationship over both ledges or rebates 48. Such a stud-bolt 7, 15 is preferably also provided at each intersection 57 (see FIG. 9) of the respective separting gaps 44 left between four adjacent main panels 6 with a bearing washer or small plate 56 projecting in straddling or overlapping relationship over the four adjacent corners of said adjacent main panels and each stud-bolt head 15 together with its washer 56 is accommodated in a mating recess or like complementary housing 58 formed in the outer end face 51 or 55 of the butt-strap 45 or of the corresponding plug 46 while being preferably filled out with glass wool or rock wool.

In order to prevent an excessive crushing, squeezing or compression of the outer end or stuffing layer 5 (if the latter is easily deformable) by the central layer of heat insulating main panels 6 each fastening stud-bolt 7 advantageously carries a stop or bearing abutment 7a adjustable in position on the stud-bolt and receiving the bearing pressure of a main panel 6 the relative position of which may thus be selectively adjusted by means of the displaceable stops 7a. Each stop 7a consists preferably of an apertured washer or small plate formed with a central threaded through-hole and screwed onto a corresponding threaded portion of the associated stud-bolt 7. Each small plate or washer has a size large enough for sidewise projecting behind the adjacent panels 6 so as to serve as a common bearing stop or abutment for at least two or more adjacent panels. Each panel 6 is thus adjusted in position relative to its spacing from the outer wall 1 by the stops 7a and is then secured by being clamped against these stops by means of the plunger nuts 15 (see FIG. 10).

According to an alternative embodiment shown on the right-hand side of FIG. 11 the continuous sheet of stuffing in particular bulk product forming the outer end layer 5 made for instance from epoxy resin may be replaced by an equivalent layer of small for instance rectangular or square blocks or slabs 5' made from cellular material which is less expensive than that of the suffing product 5 and juxtaposed in mutually contacting or contiguous relationship so as to line or cover the whole outer wall 1. These blocks or slabs 5' are advantageously directly stuck or adhesively bonded to the outer wall 1 and form an absorption layer to compensate for the irregularities, uneveness or bumpiness of the surface of this wall. For this purpose the inner surface of this layer of blocks or slabs 5' is flattened, smoothed or faced through planing by means of an automatic machine and the main panels 6 are possibly stuck or adhesively bonded to this layer of blocks or slabs 5' before being fastened to the stud-bolts 7.

Each separating gap 44 left between two adjacent main panels 6 underneath the butt-strap 45 or a plug 46 is closed towards the outer end layer 5 by a stopper pad 59 (see FIG. 11) made for instance from cellular material and preferably filled out with glass wool or rock wool.

FIG. 14 shows an alternative embodiment of the junction of a main panel 6 with two main panels 6 located respectively on either side of the first one. According to this alternative embodiment each main panel 6 comprises on each pair of opposite edges two mutually reversed rebates or ledges 60, 61, namely: one ledge 60 towards the outside and the other ledge 61 towards the inside which are thus facing towards both opposite sides, respectively, and each one of which overlaps the corresponding reversed mating or complementary ledge or rebate of one adjacent main panel 6 while preferably leaving a gap between the end of the tongue defined by each rebate or ledge of a main panel and the corresponding shoulder of the adjacent main panel. Both adjacent main panels are thus assembled through a rebated assembly-joint and each aforesaid gap towards the inside is covered by one welt-like butt-strap 62 having the same material composition as a bearing panel of the inner end layer 10 while being lined towards the outside with a portion of secondary barrier 47 and possibly towards the inside with a stiff distributing plate or board for instance of plywood 37. Each one of these butt-straps 62 fits with a bilateral peripheral clearance 28 between two adjacent bearing panels of the inner end layer 10 which are each one respectively recessed from the corresponding main panels being in flush registering or aligned relation to the surfaces of these butt-straps 62. Each recessed panel 10 thus uncovers a corresponding ledge or flange on the tongue defined by the rebate 61 and each butt-strap 62 is thus bearing or resting on two such confronting flanges or ledges while straddling or spanning the aforesaid gap. Each butt-strap 62 is preferably stuck or adhesively bonded with its own portion of secondary barrier 46 to the secondary barrier 14 of the adjacent main panels 6 to thereby restore the continuity of the fluid-tight secondary barrier.

As shown in FIG. 14 through each marginal tongue of a main panel 6 consisting of one aforesaid rebate 60 located towards the outside extend several fastening stud-bolts 7 on the free projecting end of each one of which is screwed a clamping nut 15 pressing against said rebate or ledge possibly through the medium of an interposed bearing washer 56 said free end together with its nut and its bearing washer being accommodated within a corresponding recess 58 of the covering tongue (defined by the reverse ledge or rebate 61 located. towards the inside) of the adjacent main panel 6.

Each recess 58 is preferably filled out with glass or rock wool or the like.

According to an alternative embodiment shown in particular in FIGS. 26 and 28 illustrating alternative operating steps of the building method the outer end layer 5 comprises a checker-work, criss-cross or grid-like pattern of strips, strings, beads, pellets or like patches of mastic or equivalent pasty compound material 53 provided along parallel spaced patchwork or coating lines intersecting at right angles with others and onto these strips of mastic are stuck or adhesively bonded the main panels 6, the gaps left between said mastic strips 63 being filled out with the aforesaid injected stuffing product so that these mastic strips be substantially incorporated, embedded or sunk into this stuffing product.

In order to generalize the use of various materials the secondary barrier 14 consists of plates or sheets either of plywood or laminated synthetic or plastics material whereas the main panels 6 and/or the bearing panels 10 are made either from balsa wood or from cellular material such as polyvinyl chloride or polyurethane and the outer end layer 5 may consist of a compact or cellular, foamed or expanded, homogeneous or heterogeneous, relatively hard or soft material but preferably capable of transmitting pressures while retaining a substantially constant volume.

It has been previously stated that the primary barrier 11 was secured to discrete anchoring members connecting the primary barrier to the heat insulating layer of a solid wall portion. As shown in FIGS. 9 to 11, 15 to 19 and 22, 23, respectively, each anchoring member comprises at least one fastener-carrying block 64 made from hard insulating material embedded or sunk into the inner end layer 10 preferably while extending therethrough to the secondary barrier 14 to which said fastener-holding block 64 is advantageously stuck or adhesively bonded as well as at least one metallic member with a substantially flat exposed face secured to said block 64 and preferably surrounded by a for instance metallic heat protective shield leaving a peripheral space or clearance and positioned in flush registering or aligned relation to the surface of said member as well as possibly to the inner surface of the inner end layer 10. A metal sheet of primary barrier 11 is thus locally secured to such an anchoring member in particular by spot-welding or through welding in continuous or discontinuous beads (carried preferably out through electric-arc welding) along one portion of one edge of said metal sheet or of an elongate opening cut out therein, said edge straddling or overlapping said anchoring member. Each block of hard heat insulating material 64 is made either from plywood or laminated wood preferably impregnated with synthetic resin or from a complex compound consisting of glass fibres and synthetic resin. The main function of the aforesaid heat protecting shield is to protect the block 64 and the surrounding inner end layer against the heat evolved from the welding step for fastening the primary barrier.

Each for instance rectangular metal sheet of primary barrier 11 is welded on the one hand along a portion or one half of its periphery to the aforesaid anchoring members positioned along said portion or half and on the other hand along its remaining portion or its other half preferably according to a lap assembly-joint to the adjacent metal sheets of primary barrier while covering the elongated openings provided for welding said adjacent metal sheets onto the corresponding anchoring members. For carrying out the lap joint the edge portion of the covering metal sheet is creased or canted by the thickness of the adjacent covering metal sheet so as to retain for the whole primary barrier a bearing or application surface which is substantially flat or even on its outer face, i.e. facing towards the heat insulating layer.

Each aforesaid anchoring member consists of a metallic for instance round-shaped element inserted with a peripheral clearance into the corresponding hole of a plate in particular made from sheet metal and forming said heat protective shield, said round-shaped element and said shield plate being embedded or set within the aforesaid fastener-carrying block 64 and being together with the latter in flush registering or aligned relation to the surface of or on a level with the inner face of the inner end layer 10. Each round-shaped element is possibly formed with at lest one tapped hole for temporary fastening a holding tool for retaining as by clamping a meal sheet of primary barrier to be laid.

According to the forms of embodiment shown in FIGS. 15, 16 and 17, respectively, at least some of the aforesaid round-shaped elements consist each one of a small metal plate or disk 65 accommodated within a corresponding counter-bore or like recess provided in the fastener-holding block 64 and rigidly connected on its rear or hidden face with a threaded for instance centrally positioned stud-bolt 66 screwed either directly into a tapped hole 67 of said block as shown in FIGS. 10, 11 and 15 or into a metallic or plastics socket, bush or sleeve 68 threaded internally and possibly also externally and inserted into a mating complementary hole of the block 64 as shown in FIG. 16. According to the alternative embodiment shown in FIG. 17 the metallic small plate 65 is rigidly connected on its outer face with a hollow tubular internally threaded and for instance centrally positioned nut-like sleeve 69 extending into an opening 70 of the block 64 and screwed onto a screw 71 having a head embedded or sunk into said block and extending into said opening from the opposite side thereof. Each small plate 65 may comprise several aforesaid tapped holes such as 72 (FIG. 16). Each small plate 65 is surrounded with clearance by said metallic heat protective shield 73 also embedded or sunk into the block 64.

It should be noted that by way of simplification the rigid load-distributing layer or plate 37 made for instance from plywood has not been shown in FIGS. 12, 13, 19, 23 in which it is assumed to be integrated into the inner end layer 10.

According to the forms of embodiment shown in FIGS. 18, 19 and 22, 23 at least some of said fastener-carrying blocks 64 consist each one of two elements superposed in closely contacting relationship and comprising one outer base-like element 64a stuck or glued to said secondary barrier 14, an inner element 64b for supporting the aforesaid round-shaped element and secured for instance by screws 74 and possibly also by being stuck or adhesively bonded to the outer element 64a. The aforesaid round-shaped element is here constituted by a hollow casing or box 75 comprising a preferably substantially circular cylindrical cup with a flat bottom and with a radially projecting peripheral outer edge or rim forming a fastening flange 76, this round-shaped element being embedded or sunk into a mating complementary hole extending through the inner block element 64b so that its flat bottom be positioned in flush registering or aligned relation to the surface of the inner face of said inner element 64b. The aforesaid hole formed in the inner element 64b advantageously comprises a spot-facing, counterbore or like recess 77 towards the outside for accommodating the flange 76 of the round-shaped element. The projecting inner end portion of the round-shaped element 75 towards its flat bottom is surrounded as in the case of FIGS. 15 to 17 by a metallic plate 73 forming an apertured heat protective shield formed with a central hole 78 through which extends the flat-bottomed inner end portion of the round-shaped element 75 while leaving a peripheral radial clearance about the latter. This shield-like plate 78 is housed in a corresponding spot-facing or like counterbore or recess 79 formed in the inner face of the block 64 so as to be positioned in flush registering or aligned relation to the surface of this inner face and to the exposed face of the flat bottom of the round-shaped element.

The cup portion of each round-shaped element 75 is advantageously closed by a cover or lid 80 fitted into the cup portion whereas the enlarged recess 77 formed in the aforesaid element 64b supporting said round-shaped element is preferably filled up with a resin of like packing or sealing compound material covering said lid and in which is embedded the flange 76 of the cup portion 75. This lid 80 forms a resin-saving device since it enables to reduce the required amount of resin within the recess 77 while preventing the resin from entering the inner cavity of the cup 75. This inner cavity of the cup 75 is possibly filled out with glass wool or rock wool 81. Each shield-like plate 73 may be secured to its block 64 (for instance of rectangular or square parallelepidic shape) in particular near each corner thereof by a sharp-pointed metallic prong 82 rigidly connected to the plate 73 and driven into the block 64. Each sharp-pointed prong 82 is for instance made integral or in one piece with the plate 73 by being formed through a bias lancing cut or skew notch made in the sheet metal of the plate 73 the sharp-pointed prong thus formed being thus tucked or bent substantially at right angles with respect to the plate 73.

The forms of embodiment according to FIGS. 15 to 21 are more particularly adapted to the anchoring of a metal sheet of primary barrier 11 so that the round-shaped element 65 or 75 and its associated shield-like plate 73 are embedded or sunk into the block 64 so as to be aligned in flush registering relationship or on a level with the surface of the inner face 83 of the inner end layer 10. in this instance the round-shaped element 65 or 75 comprises a plurality of tapped holes 72 which are for instance aligned and provided in a number of three in the flat bottom of the round-shaped element 75 in FIGS. 18 to 20. In the case of FIGS. 9, 18 and 19 the shield-like plates 73 of the anchoring members or pieces 65 or 75 forming for instance round-shaped elements are advantageously aligned in rows extending in parallel relation to both perpendicular directions of the corrugations 29 of the primary barrier 11 and each aforesaid shield-like plate 65 or 73 extends throughout the length of the surface span of solid wall 83 of the inner end layer 10 defined between two successive slots or grooves 28 provided in the inner face of the latter, i.e. from one edge to the other of each pair of successive grooves defined by these slots or slits (see FIG. 9). Every aligned bank of such shield-like plates thus provides a kind of discontinuous metallic strip, that is interrupted transversely of its lengthwise direction at or past each slot or slit 28.

FIGS. 20 and 21 respectively show the local fastening of a metal sheet of primary barrier 11 to a single anchoring member such for instance as the one shown in FIGS. 18 and 19 together with the method of preparing the fastening welding step, namely the step of positioning and retaining or holding in pressed contact or like engaging relationship through clamping, this kind of fastening being however also applicable to various other forms of embodiment of anchoring member or round-shaped element 65 shown in FIGS. 15 to 17, respectively. For this local fastening of one metal sheet of primary barrier 11, this metal sheet should be formed with a through-opening or aperture of oblong or at least approximately oval and preferably elongated shape 84 comprising for instance a pair of substantially straight opposite edges connected to each other at each one of their opposite ends by an in particular semi-circular arc of circumference forming the respective terminal ends of the opening 84 which is thus provided with a centre of symmetry. The over-all length of this opening 84 is preferably less than the diameter of the circular flat bottom of the round-shaped element 75 and its width is preferably less than one half of this diameter while being possibly nearly equal to or greater than one third of this diameter. The relative position of the opening 84 in the metal sheet 11 may be defined with a certain tolerance the limits of which are determined by the desirable requirement that the opening 84 should contain at least one tapped hole 72 of the round-shaped element 75 and that the edge of the aperture 84 be located at least in closely adjacent relation, i.e. in direct proximity to the edge of one hole 72 preferably in such a manner that the edge of the aperture 84 be substantially externally tangential to the edge of one hole 72. In FIG. 20 has been shown through a continuous closed solid line an opening 84 actually provided in the metal sheet 11 and surrounding the left-hand end hole 72 of the round-shaped element 75 whereas the two other discontinuous lines drawn in dash-dotted lines show two other possible relative positions, respectively, of the opening 84 encompassing the central and the right-hand end holes 72, respectively, in FIG. 20 while complying with the aforesaid required tolerance conditions. In FIG. 20 the longitudinal center line axis of symmetry of the opening 84 is directed at right angles to the direction of alignment of the three tapped holes 72 shown but this relative orientation of the aperture 84 could be different and for instance such that its longitudinal center line axis coincides with the common axis of alignment of the holes 72 or is substantially parallel to the direction of alignment of these holes.

The metal sheet 11 having thus been properly positioned as to the relative position of the opening 84 with respect to the tapped holes 72 of the round-shaped element 75 said metal sheet is held in place by being pressed against the round-shaped element by means of a suitable tool consisting advantageously in particular of a lock-screw 85 the for instance knurled or milled head is provided with an enlarged collar this screw being threaded into the tapped hole 72 encompassed by the opening 84 so that the screw overlaps with its collar head the adjacent edge of the opening 84. The metal sheet 11 is thus held against motion by being clamped against the round-shaped element 75 by means of the aforesaid screw which moreover accomplishes the function of applying that portion of the edge of the opening 84 which is located above the round-shaped element 75 uniformly against the flat surface of the latter thereby preventing any gaping between this edge portion of the opening 84 and the round-shaped element 75 just in that area where this edge has to be welded to the round-shaped element. Then this portion of said edge located above the round-shaped element 75 is welded for instance through electric-arc welding by forming either a continuous bead 86 or a discontinuous bead or also single or discrete tack welds which are spaced along this edge portion while preferably terminating the welding of this joint or seam before reaching the peripheral edge of the round-shaped element 75 for the sake of safety. By way of mere illustration the round-shaped element 75 may have for instance a diameter of 58 mm; the opening 84 may have a length of 50 mm and a width of 22 mm; the three tapped holes 72 (the intermediate hole of which is preferably located at the center of the round-shaped element) may have their centers spaced by distances of 12 mm and the welding bead may have a least length for instance of about 45 mm while being limited by a circumference of about 50 mm concentric with the round-shaped element 75 and containing the welded joint or seam. The metal sheet 11 may thus comprise several spaced openings 84 with edges welded to corresponding separated round-shaped elements 75, respectively, and after termination of this fastening step the apertures 84 which preferably have marginal positions located in the vicinity of the edge of the metal sheet are then respectively covered by the edge portion of at least another adjacent metal sheet of primary barrier which is then welded to form fluid-tight continuous welds along the lap-joints to the covering metal sheet 11. The present invention is therefore in particular directed to this process of local fastening of a metal sheet of primary barrier.

The anchoring system shown in FIGS. 22 to 24 is adapted to achieve the local fastening of the primary barrier 11 at the junction of four in particular rectangular metal sheets of primary barrier 11a, 11b, 11c and 11d, respectively (in FIG. 24). These four metal sheet mutually overlap in pairs with their edges along creased marginal portions or edges 87, i.e. the covering portion of each metal sheet is creased through a suitable reverse bend double folding in opposite directions so as to provide a corresponding accommodation for that portion of covering metal sheet which is located under the creased portion of covering metal sheet so as to retain the flatness of application surface common to the four metal sheets against the inner end layer 10. Each aforesaid creasing 87 has therefore a size defined by the thickness of the covering metal sheet. Each one of said four metal sheets has advantageously its corner or apex cut on the bias or slantwise along a straight section 88 inclined for instance substantially through 45°, the four sections 88 having preferably the same lengths. The respective parallel sections 88 of each pair of adjacent metal sheets 11a, 11d and 11b, 11c which are diagonally opposed with their corners or vertices are arranged above one common anchoring piece 89 consisting advantageously of a solid for instance square metal plate secured to the flat surface or bottom of the round-shaped element 75 in substantial coaxial relation thereto for instance by spot-welds 90 carried out through electric resistance welding (see FIGS. 22 and 23). In this instance the round-shaped element 75 together with its plate 73 forming a heat protective shield are more deeply embedded or sunk into the element 75b (carrying the round-shaped element) of the block 64 down to the bottom of the aforesaid recess 79 so that the square plate 89 be flush or on a level in aligned registering relationship with the inner surface 83 of the inner end layer 10. The square plate 89 is of a size large enough to contain at least entirely the four cut bevel sections 88 of the metal sheets 11a to 11d, these bevel cuts being preferably oriented in pairs of opposite sections in parallel relation to both respective diagonal directions of the square plate 89 the size of which is such for instance that the opposite ends of each cut bevel section 88 are located substantially above the corresponding adjacent edges or sides of the square plate 89. The square plate 89 is of a size large enough to project or protrude from the corresponding round-shaped element 75 about the latter so as to cover or overlap in contacting relationship the aforesaid shield-like plate 73 surrounding the flat bottom of said round-shaped element as shown in FIG. 23. The respective parallel bevel sections 88 of each pair of adjacent metal sheets diagonally opposed with their corners or vertices are advantageously spaced from each other so as to leave uncovered in the center a rectangular and in particular square portion 91 of the square plate 89 forming said common anchoring member (see FIG. 24). Each one of said four metal sheets of the primary barrier 11 is then welded for instance through electric-arc welding to form a continuous bead 92 along the joint constituted by the edge of its bevel section 88 with the surface of the square plate 89 to be secured to the latter and/or with at least one adjacent partially covered metal sheet for being also secured to the latter.

There may be various combinations of overlapping configurations for the four aforesaid metal sheets two by two. According to the configuration shown in FIG. 24 the metal sheet 11a is covered or overlapped by a respective portion of each metal sheet 11b and 11c other respective portions of which are themselves covered or overlapped together by the metal sheet 11d. It results therefrom that the metal sheet 11d which is fully exposed comprises two corresponding creases 87 located past the adjacent edges 88, respectively, of the partially covered adjacent metal sheets 11b and 11c. Other combinations of mutual overlapping configuration are of course possible: for instance each one of said four metal sheets may be partially covered or overlapped by one of the three other ones and partially cover or overlap itself another one of the three others. In the central region of the common junction area the intermediate exposed central segments of the four bevel sections 88, respectively, form with their respective edges a central square along the four sides of which extends a substantially continuous welding bead 92.

At the junction of four rectangular metal sheets of primary barrier the aforesaid common anchoring member consisting of the square plate 89 is also surrounded in spaced relationship with clearance by a heat protective shield the surface of which is aligned in flush registering relationship or on a level with that of the square plate 89 and which is constituted for instance by four in particular metallic mutually adjacent plates 73' aligned with four rows or banks of said aligned anchoring members, respectively, along two perpendicular directions crossing in the middle point of the square plate 89 as shown in particular in FIG. 9. These shield-like plates 73' preferably meet each other two by two along miter or bevel joints or the like 92 while possibly leaving a gap or spacing therebetween as shown in FIG. 16. The four shield-like plates 73' are thus mutually opposed and aligned in pairs while thus extending each one from the square plate 89 to the slot or slit 28 defining the surface span of solid wall 89 of the inner end layer 10 containing the anchoring member involved (see FIG. 9). Each plate 73' may be secured to the inner end layer 10 in the same manner as the plates 73, i.e. for instance by means of sharp-pointed prongs 82 partially cut or lanced in each plate 73' and bent or folded back at right angles with respect thereto. As shown in FIGS. 22 and 23 each plate 73' is separated by an intermediate space 94 from the square plate 89.

FIGS. 10 and 11 show in particular the fastening of two adjacent metal sheets of the primary barrier 11 along a welded lap-joint 95 onto an anchoring member 65 (according to one of the forms of embodiment shown in FIGS. 15 to 17) common to both metal sheets.

FIGS. 25 to 31 illustrate various operating steps of the method of building or mounting a fluid-tight heat insulating wall structure in particular according to FIGS. 9 to 13. As already stated previously this method consists successively in laying stud-bolts 7 for fastening the aforesaid main panels, in particular by welding said stud-bolts to the inner face of the outer metallic wall 1; preparing said inner surface by a processing treatment promoting the adhesion or adhesive bonding of the outer end layer consisting of the stuffing product 5 (FIG. 25); laying at least one jig, gauge or like template 24 forming a removable and reusable shuttering, formwork or like framing plate spaced from the outer wall 1 by securing same onto the fastening stud-bolts 7 for instance by means of nuts 15 and lock nuts or checknuts 22 screwed onto said stud-bolts to thereby define together with the outer wall 1 a space forming a mould for injecting the stuffing product 5 (FIG. 26); injecting said stuffing product 5 into said mould to form the outer end layer 10; then removing each jig 24; prefabricating the main panels of the central layer 6 as well as the bearing panels of the inner end layer 10; mounting a sheet of prefabricated main panels 6 against the outer end layer 5 by fastening same by means of the stud-bolts 7, bearing washers 56 and nuts 15; filling out each gap 44 between any two adjacent main panels 6 with an interposed joint packing insert; mounting the inner end layer of prefabricated bearing panels 10 (FIG. 29); and in completing the mounting of the wall structure and then in securing the primary barrier 11 to the inner end layer 10 (FIG. 31).

The present embodiment aims more particularly at carrying out the operating steps consisting in laying the stud-bolts 7 with spacings therebetween or a pitch substantially corresponding to the distance between two successive gaps 44 between adjacent main panels 6; sticking or adhesively bonding said main panels comprising the glued secondary barrier 14 to the outer end layer 5; incorporating anchoring members 64 to 81, 89 of the primary barrier into the inner face 83 of the bearing panels of the inner end layer 10 preferably during the prefabrication thereof; sticking or adhesively bonding said bearing panels of the inner end layer 10 to the inner face of the secondary barrier 14 provided on the main panels 6, respectively; laying and securing through gluing welt-like butt-straps or like covering strips 45 and the aforesaid plugs 46; and affixing the primary barrier 11 to said anchoring members.

If bearing stop means or like abutments 7a are provided these are mounted and adjusted in position before the laying of the panels 6 and prior to injecting the stuffing product 5. In such a case the panels 6 are at first laid and secured against the stop means 7a so that these panels then serve as a jig for moulding or injecting the stuffing product on site. After such an injection the stop means 7a may either remain in place or be removed (so that the panels 6 then directly bear against the layer 5).

If the outer end layer consists of small blocks or slabs 5' no jig 24 is used since the small blocks or slabs are separately laid by being stuck or adhesively bonded to the outer wall 1 and these laid small blocks or slabs are then planed together throughout their inner face to define a reference plane for laying the panels 6 which are then possibly stuck or adhesively bonded to the small blocks or slabs 5' and then secured by means of the stud-bolts 7.

FIG. 30 illustrates the operating step for laying and securing each aforesaid welt-like butt-strap 45 or each aforesaid plug 46. After the laying of the butt-strap or plug an engaging pressure is applied and kept effective onto the butt-strap or the plug so as to enable the adhesive to set, by means of at least one pressing tool comprising at least two threaded tie-rods 96 screwed into two tapped holes, respectively, formed in two anchoring members located on either side, respectively, of the butt-strap 45 or the plug 46. By using for instance anchoring members according to the form of embodiment shown in FIG. 16 and integrated into the inner end layer 10 when prefabricating the bearing panels forming same the anchoring member 65 (together with its integral stud-bolt 66) is removed from each one thereof while however leaving in place the shield-like plate 73 on each block 64 and then each tie-rod 96 is screwed into the threaded bore of the socket-like insert 68 incorporated into the associated block 64. The aforesaid pressing tool moreover comprises a rigid transverse beam or bar 87 extending over the butt-strap 45 or the plug 46 involved and slipped with two holes extending through its opposite ends, respectively, onto both tie-rods 96, respectively, which comprise each one in particular towards their free ends a transverse removable or detachable locking pin or like means 98 or any other suitable locking system forming a stop means for the beam 97 to prevent the latter from leaving the tie-rods 96. The tooling finally comprises at least one flexible or resilient bag forming a pneumatic bladder or cushion inflatable with compressed air and for instance two such bags, bladders or like air enclosures 99 each one of which is interposed between on the one hand a resilient sitting bed-plate or bolster 100 made for instance from rubber and placed onto the butt-strap 45 or onto the plug 46 and on the other hand a shim for instance of wood or like bearing plate 101 rigidly connected to the beam 97 and placed above each bag 99, respectively. After having applied the butt-strap 45 or the plug 46 onto the surfaces 49, previously coated with adhesive, of the secondary barrier 14 and 48 of the rebates provided on the main panels 6 this pressing tool is positioned, the bags or bladders 99 being initially in a deflated or collapsed condition and then these bags are inflated with compressed air or some other gaseous or liquid fluid under pressure for strongly applying the butt-strap 45 or the plug 46 against said surfaces coated with adhesive, this clamping pressure being maintained until the adhesive bond has set.

FIGS. 27 and 28 show an alternative embodiment of the operating step for laying the stud-bolts 7 which consists in welding internally threaded tubular sockets 102 forming base collars for the stud-bolts to the outer wall 1 and then screwing into these sockets short threaded rods 7', respectively, adapted to fasten the jig 24, these short threaded rods 7' being then replaced by longer threaded rods forming the final stud-bolts proper 7 for fastening the main panels 6.

According to another alternative embodiment illustrated in FIGS. 26 and 28 spaced strips, strings or beads of special mastic or of like equivalent pasty compound or product 63 are applied to the inner face of the outer wall 1 the thicknesses of these strips 63 being at least equal to that of the outer end layer 6 subsequently provided for instance through injection.

It should be noted that before laying the butt-straps 45 or the plugs 46 the cavity 58 thereof adapted to accommodate the free ends of the stud-bolts 7 together with their nuts 15 and their bearing washers or small plates 56 is filled out with glass wool or rock wool.

It should be understood that the invention is not at all limited to the forms of embodiments described and shown which have been given by way of example only. In particular it comprises all the means constituting technical equivalents of the means described as well as their combinations if the latter are carried out according to its gist and used within the scope of the appended claims.

What is claimed is:

1. A fluid-tight and heat insulating wall structure for a fluid-tight heat insulated tank, comprising a self-supporting and rigid outer wall, a fluid-tight primary barrier consisting of a substantially flexible membrane-like impervious inner wall spaced from said outer wall; and an intermediate heat insulating structure, a fluid-tight secondary barrier embedded in said heat insulating structure, fastening means to secure said intermediate heat insulating structure to said inner wall and to said primary barrier, said intermediate heat-insulating structure and said fastening means being capable of transferring loads from said primary barrier to said outer wall, said primary barrier being applied against and supported by said intermediate heat insulating structure, said inner wall of said primary barrier being made from thin corrugated sheet metal formed with at least one set of spaced substantially parallel corrugations projecting inwards from the inside only; said intermediate heat insulating structure including from the inside towards the outside; (i) a separating layer of a heat-insulating and load distributing material selected from the group consisting of balsa wood, plywood and rigid cellular materials, said separating layer being in continuous contact with said fluid-tight secondary barrier and secured thereto and comprising at least one set of spaced substantially parallel slots each extending through at least a major part of the thickness of said separating layer and each located substantially at a corrugation of said primary barrier and extending along the said corrugation, (ii) the aforesaid fluid-tight secondary barrier (iii) at least one heat insulating layer.

2. Structure according to claim 1 including a joint packing insert filling said slots.

3. Structure according to claim 1, wherein said separating layer consists of juxtaposed bearing panels, the aforesaid slots being formed by gaps provided between each pair of adjacent such bearing panels.

4. Structure according to claim 1, wherein said separating layer consists of juxtaposed bearing panels, the aforesaid slots comprising slots formed by gaps provided between each pair of adjacent such bearing panels and slots extending in said bearing panels through a major part of the thickness thereof.

5. Structure according to claim 1, wherein said heat-insulating layer comprises injected cellular material adhesively bonded to said outer wall.

6. Structure according to claim 1, wherein said secondary barrier is made from thin corrugated sheet metal formed with at least one set of spaced substantially parallel corrugations projecting outwards from the inside only, the said corrugations of said secondary barrier being substantially parallel to those of said primary barrier and respectively each being in aligned relation to a corresponding corrugation of said primary barrier.

7. Structure according to claim 1, wherein said secondary barrier is a sheet of epoxy resin reinforced with glass fibre and adhesively bonded to said heat insulating layer.

8. Structure according to claim 1 including metallic fastening means securing the aforesaid primary and secondary barriers to each other at spaced discrete points through said separating layer, each said metallic fastening means comprising a relatively fine rod and a base plate integral with one end of said rod, said base plate being secured to the inner face of said secondary barrier, a nipping piece for engaging the free opposite end of said rod, and said nipping piece being secured to the outer face of said primary barrier and comprising a a cup-shaped element affixed to said primary barrier with its peripheral skirt edge, the bottom wall of said element having a through-hole with edges creased inwards of said cup-like member to form closely spaced springy clamping tongues for nipping said rod when its free end is inserted into said hole.

9. Structure according to claim 1, wherein said separating layer is lined on its inner face with a load-distributing layer consisting of plates of a material selected from the group consisting of plywood and stiff synthetic material.

10. Structure according to claim 1, wherein two superposed heat-insulating layers are provided and comprise an outer heat-insulating layer in contact with the outer wall and a second heat-insulating layer in contact with said secondary barrier, said outer heat-insulating layer consisting of a wooden grid formed by a lattice of joists distributed in two sets of parallel spaced joists crossing each other substantially at right angles and stud-bolts securing said spaced joists to said outer wall, a relatively thin stuffing material being interposed between said joists and said outer wall, and a cellular material filling spaces between said joists, the inner one of said two superposed heat insulating layers being adhesively bonded to said joists.

11. Structure according to claim 1 wherein said secondary barrier and said heat-insulating layer consist of a plurality of adjacent panels of at least approximately rectangular shapes, packing joint inserts on the side of the outer surface of said heat insulating layer separately adjacent panels and rigid welt-like butt-straps located on the side of said secondary barrier, so as to cover said packing joint inserts, each said butt-strap comprising an outer layer of the same material as said heat insulating layer and an inner layer of the same material as said separating layer and being wider than said outer layer, so as to form two shoulders therewith, the inner surface of said outer layer being in substantially flush registering and aligned relationship with the inner surface of said panels, said inner layer having substantially the same thickness as said separating layer, being substantially in flush registering and aligned relationship with the surfaces of said separating layer and being continuously separated from said outer layer by a portion of said secondary barrier which extends onto said shoulders and which is in bonding relationship with said shoulders, the edges of the inner surface of said panels being in bonding relationship with said shoulders to provide in combination a continuous secondary barrier with said portion of said secondary barrier.

12. Structure according to claim 11, wherein the outer layer of said butt-strap comprises a load-distributing lining consisting of plates of a material selected from the group consisting of plywood and stiff synthetic material.

13. Structure according to claim 1, wherein said secondary barrier and said heat insulating layer comprise at least one panel comprising a pair of inner and outer rigid plates made from a material selected from the group consisting of plywood and rigid synthetic material, said inner plate constituting said secondary barrier and being separated from said outer plate and by an intermediate filling material between and in bonding relationship with said inner and outer plates.

14. Structure according to claim 13, wherein said fastening means comprise metallic stud-bolt and nut assemblies, each aforesaid panel being secured to said outer wall, the said stud-bolts extending through said filling material and the said nuts bearing against the inner face of said outer rigid plate of said panel, and cores of cellular material filling holes provided for applying said nuts.

15. Structure according to claim 13, wherein said filling material consists of at least one layer of a material selected from the group consisting of balsa wood and cellular material whereas said rigid plates are made from plywood and said outer rigid plate is thicker than said inner rigid plate.

16. Structure according to claim 13, wherein said secondary barrier and said heat-insulating layer consist of a plurality of adjacent aforesaid panels of at least approximately rectangular shapes, intermediate packing joint inserts supporting said panels and plywood covering strips lining the inner sides of said inserts and forming welt-like butt straps.

17. Structure according to claim 15, wherein each aforesaid panel comprises on at least two opposite edges thereof slanting inward tapering edge faces so that each aforesaid intermediate packing joint insert has a substantially trapezoidal cross-sectional contour the big base thereof being located inwards.

18. Structure according to claim 1 including fastening means securing said secondary barrier to said primary barrier at spaced discrete points through said separating layer, each said fastening means comprising a heat-insulating fastener-holding block extending through the whole thickness of said separating layer and being in bonding relationship with said secondary barrier on the whole area common to said block and said secondary barrier, and a metallic element welded to said primary barrier and rigidly connected to said fastener-holding block.

19. Structure according to claim 18 including stud bolt means secured in said block whereby said metallic element is rigidly connected to said fastener-holding block.

20. Structure according to claim 18 including an internally threaded sleeve rigidly connected to said block, extending into an opening thereof, and a screw secured into said sleeve and having a head embedded into said block and extending into said opening from the opposite side thereof.

21. Structure according to claim 18, wherein said fastener-holding block consists of two superimposed members, screws interconnecting said members, the said metallic element being a round-shaped and hollow anchoring element located in an opening of the inner most member of said fastener-holding block and having an outer wall provided with an anchoring peripheral edge located in a recess of the said opening, a round-shaped side wall and an inner wall the outer surface of which is flush with that of said block and constitutes that part of the metallic element by which the latter is welded to the primary barrier.

22. Structure according to claim 21, wherein said round-shaped anchoring element is filled with a heat-insulating material.

* * * * *